(12) United States Patent
Vecoven et al.

(10) Patent No.: US 7,313,717 B2
(45) Date of Patent: Dec. 25, 2007

(54) ERROR MANAGEMENT

(75) Inventors: Frederic Louis Ghislain Gabriel Vecoven, Angleur (BE); Sundeep R. Panicker, Castro Valley, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1005 days.

(21) Appl. No.: 10/417,811

(22) Filed: Apr. 17, 2003

(65) Prior Publication Data

US 2004/0210800 A1    Oct. 21, 2004

(51) Int. Cl.
*G06F 11/00* (2006.01)

(52) U.S. Cl. .......................................... 714/4
(58) Field of Classification Search .................... 714/4, 714/11, 13, 25, 30
See application file for complete search history.

(56) References Cited

U.S. PATENT DOCUMENTS

| | | | |
|---|---|---|---|
| 3,928,830 A | 12/1975 | Bellamy et al. | |
| 5,123,017 A * | 6/1992 | Simpkins et al. | 714/26 |
| 5,237,677 A * | 8/1993 | Hirosawa et al. | 714/57 |
| 5,802,077 A * | 9/1998 | Yeh | 714/797 |
| 6,452,809 B1 | 9/2002 | Jackson et al. | |
| 6,556,438 B1 | 4/2003 | Bolognia et al. | |
| 6,583,989 B1 | 6/2003 | Guyer et al. | |
| 6,725,396 B2 * | 4/2004 | Ahrens et al. | 714/10 |
| 6,792,564 B2 * | 9/2004 | Ahrens et al. | 714/45 |
| 6,889,167 B2 * | 5/2005 | Curry, III | 702/183 |
| 6,901,344 B2 | 5/2005 | Mantey et al. | |
| 7,065,599 B2 | 6/2006 | King | |
| 2002/0095625 A1 * | 7/2002 | Ahrens et al. | 714/44 |
| 2002/0124114 A1 | 9/2002 | Bottom et al. | |
| 2002/0124213 A1 * | 9/2002 | Ahrens et al. | 714/57 |
| 2003/0030990 A1 | 2/2003 | King et al. | |
| 2003/0033364 A1 | 2/2003 | Garnett et al. | |
| 2003/0033366 A1 | 2/2003 | Garnett et al. | |
| 2003/0033399 A1 | 2/2003 | Garnett et al. | |
| 2003/0033409 A1 | 2/2003 | King et al. | |
| 2003/0033460 A1 | 2/2003 | King et al. | |
| 2003/0033544 A1 | 2/2003 | King et al. | |
| 2003/0048615 A1 | 3/2003 | King et al. | |
| 2003/0051167 A1 | 3/2003 | King et al. | |

(Continued)

FOREIGN PATENT DOCUMENTS

EP    0 511 834    11/2002

OTHER PUBLICATIONS

International search report application No. PCT/IB2004/001644 mailed Nov. 8, 2004.

(Continued)

*Primary Examiner*—Nadeem Iqbal
(74) *Attorney, Agent, or Firm*—Meyertons Hood Kivlin Kowert & Goetzel, P.C.; B. Noël Kivlin

(57) ABSTRACT

A computer system includes a plurality of field replaceable units. A system controller monitors system errors. A diagnostic engine is responsive to the system controller detecting an error to identify a faulty field replaceable unit. A reconfiguration engine can then be operable to deconfigure the faulty field replaceable unit. By providing a diagnostic engine to identify a faulty field replaceable unit to be deconfigured, greater reliability with regard to the identification of a faulty unit can be achieved.

35 Claims, 19 Drawing Sheets

U.S. PATENT DOCUMENTS

2004/0078711 A1    4/2004  King et al.
2005/0049825 A1    3/2005  King et al.

OTHER PUBLICATIONS

Bosen, et al, "Fault-Tolerant Design of the IBM pSeries 690 Sysem Using POWER4 Processor Technology", IBM Journal of Research and Development, vol. 46, No. 1, Jan. 2002, XP002302455.
Anonymous, "Storing Failure Information into Non-Volatile Memory", IBM Technical Disclosure Bulletin, vol. 37, No. 11, Nov. 1, 1994, pp. 419-420, New York, NY, XP000487287.
Anonymous, "Error-Reporting Registers", IBM Technical Disclosure Bulletin, IBM Corp., New York, NY, vol. 30, No. 6, Nov. 1, 1987, pp. 79-80, XP000714517.
Gonscherowski, "Sun Fire™ 6800/4810/4800/3800 Auto Diagnosis and Recovery Features", Sun Blueprints, Santa Clara, CA, Apr. 2003, XP002302457.
International search report application No. PCT/IB2004/001644, mailed Feb. 22, 2005.
"Dynamic Logical Partitioning in IBM eserver pSeries", IBM White Paper, Oct. 2002, New York, USA, pp. 1-9.

* cited by examiner

ERROR MANAGEMENT

BACKGROUND OF THE INVENTION

The present invention relates to a method and apparatus for facilitating hardware fault management in a computer system, for example a computer server system.

In a conventional computer system, when a hardware error occurs, one or more server domains will crash. Typically, this can result in one or more error messages being printed on a console, and eventually the affected domain(s) will reboot. During this reboot, a Power On Self Test (POST) utility or the like may catch the faulty component(s) and deconfigure that component or components from the system. However, this approach has its disadvantages. When the system restarts, POST has to recreate the error during its diagnostic phase, diagnose the faulty component and deconfigure it out of the system. However, users often set the diagnostic level of POST to a low value thus restricting POST's diagnostic capabilities. Thus, even after a domain reboots, there is no guarantee that the fault has been isolated and will not recur. POST may also not detect the error, which might have been triggered by some specific sequence of events. Also, information regarding the crash is typically not saved.

Accordingly, there is a need for an improved method and apparatus for facilitating hardware fault management in a computer system, for example a computer server system.

SUMMARY OF THE INVENTION

The present invention provides a computer system, a method of operating a computer system and a program product that can enable increased availability of a server system in the presence of dynamically detected hardware errors.

One aspect of the invention provides computer system. The computer system includes a plurality of field replaceable units. A system controller can be operable to monitor system errors. A diagnostic engine can be responsive to the system controller detecting an error to identify a faulty field replaceable unit. A reconfiguration engine can then be operable to deconfigure the faulty field replaceable unit.

By providing a diagnostic engine to identify a faulty field replaceable unit to be deconfigured, greater reliability with regard to the identification of a faulty unit can be achieved.

The diagnostic engine can be operable to analyze hardware generated information distinguishing a first error from non-first errors. The error information can be held in registers in circuitry in the field replaceable units, with first errors being separately identified. A field replaceable unit can include further circuitry for reporting errors in the field replaceable unit to the system controller.

The diagnostic engine can cause status information concerning a faulty field replaceable unit to be recorded in the faulty field replaceable unit.

If the diagnostic engine identifies a set, or list of suspect faulty field replaceable units, status information concerning each suspected faulty field replaceable unit can be recorded in the suspected faulty field replaceable unit concerned.

The status information can be stored in a dynamic portion of a field replaceable unit identity (FRUID) memory in the field replaceable unit concerned. The FRUID memory can, for example, be an electrically erasable programmable read only memory.

In operation, the diagnostic engine can be responsive to previously recorded suspect fault information in a field replaceable unit in determining whether the field replaceable unit is faulty.

The device reconfiguration engine can be operable to configure a redundant hardware field replaceable unit in place of a deconfigured faulty field replaceable unit.

The device reconfiguration engine is responsive to recorded status information in a faulty field replaceable unit to deconfigure the faulty field replaceable unit.

In one example, the auto diagnosis engine is a software component of the service controller and the device reconfiguration engine is a power on self test utility.

Another aspect of the invention provides a method of managing errors in a computer system that includes a plurality of field replaceable units. The method can include a system controller monitoring system errors in the field replaceable units and a diagnostic engine identifying a faulty field replaceable unit, whereby the faulty field replaceable unit can be deconfigured from the computer system.

A further aspect of the invention provides program product comprising instructions operable to cause a computer system to carry out the aforementioned method. The computer program can be provided on, a carrier medium, for example a storage medium of a transmission medium.

BRIEF DESCRIPTION OF THE DRAWINGS

Embodiments of the present invention will be described hereinafter, by way of example only, with reference to the accompanying drawings in which like reference signs relate to like elements and in which.

Figure 1A:
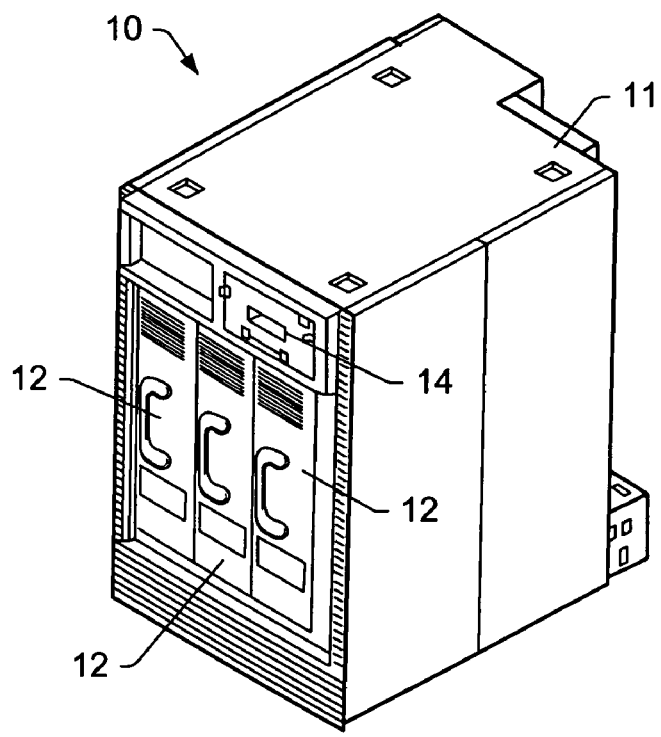
FIG. 1, formed from FIGS. 1A and 1B is a schematic illustration of a first computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims. In this regard, it is envisaged that combinations of features from the independent claims with features of dependent claims other than as presented by the dependencies of the claims, and also with features from the description, is also envisaged.

DESCRIPTION OF PARTICULAR EMBODIMENTS

Examples of the present invention will be described hereinafter with reference with to the accompanying drawings.

Figure 1B:
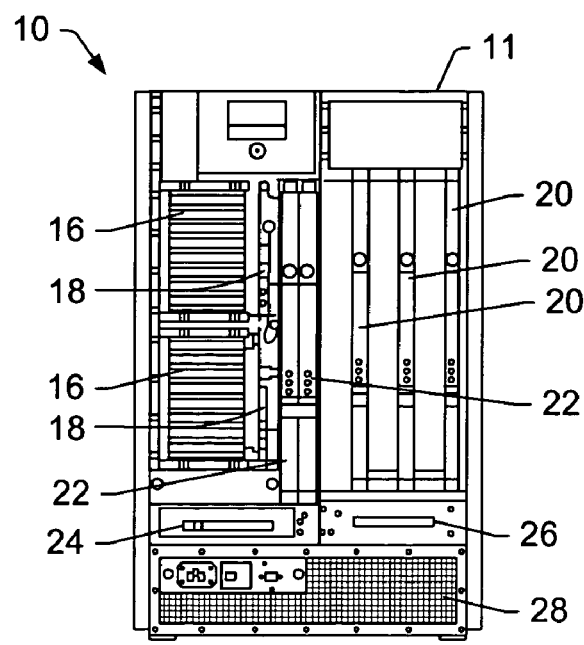

FIG. 1, which is made up of FIGS. 1A and 1B illustrates one example of a highly available, flexible stand-alone or rack-mountable computer server system. FIG. 1A is a perspective view generally from the front of the server 10 and FIG. 1B is a view from the rear of the server 10.

The server illustrated in FIG. 1 comprises a number of field-replaceable units (FRUs), which are mountable within a chassis 11. The FRUs are all modules that can be replaced in the field.

In the example shown in FIG. 1, these modules include up to three system boards 20, which are receivable in the rear face of the chassis 11. Using the system boards, support can be provided, for example, for between 2 and 12 processors and up to 192 Gbytes of memory. Two further modules in the form of I/O boards 16 are also receivable in the rear face of the chassis 11, the I/O boards 16 being configurable to support various combinations of I/O cards, for example Personal Computer Interconnect (PCI) cards, which also form FRUs.

Also mountable in the rear face of the chassis 11 are FRU modules in the form of system controller boards 18 and switch interconnect boards 22. The switch interconnect boards 22 are also known as repeater boards. First and second fan tray FRU modules 24 and 26 are also receivable in the rear face of the chassis 11. A further component of the rear face of the chassis 11 is formed by a power grid 28 to which an external power connections can be made.

Three power supply FRU modules 12 can be provided to provide N+1 DC power redundancy. A further fan tray FRU module 14 is receivable in the front face of the chassis 11.

Figure 2A:
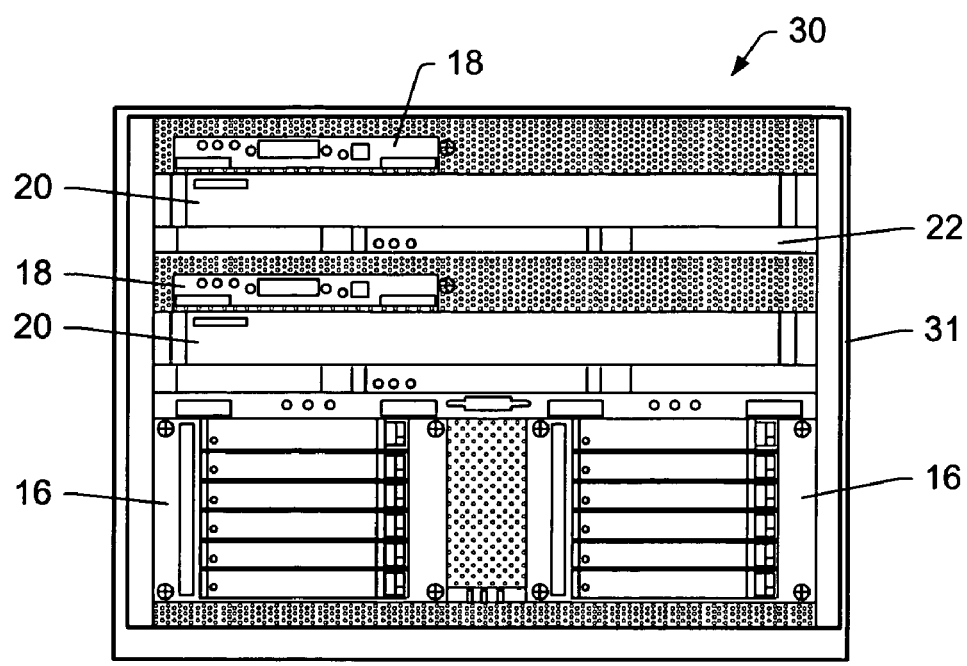
FIG. 2, formed from FIGS. 2A and 2B is a schematic illustration of a second computer system.
Figure 2B:
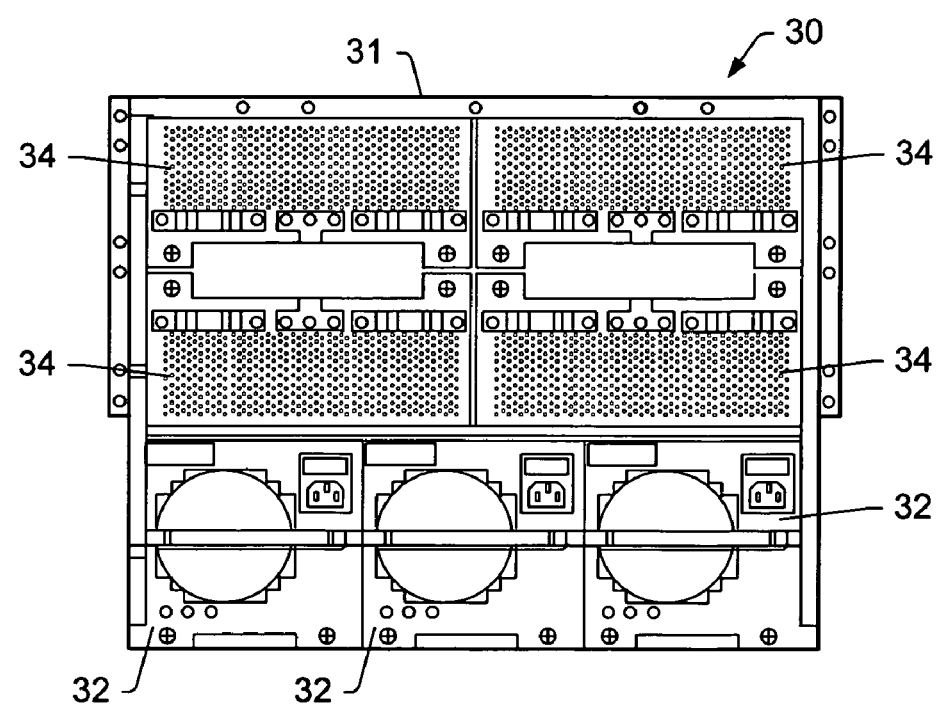

FIG. 1 is but one example of a system within which the present invention may be implemented. FIG. 2A is a front view of a second example of a computer server system 30 and FIG. 2B is a rear view of that system.

It will be noted that in this second example, two FRU modules in the form of system boards 20 and two further FRU modules in the form of system controller boards 18 are receivable in the front face of the chassis 31 of the computer server system 30. Two FRU modules in the form of I/O boards 16 are also receivable in the front surface of the chassis 31, each for receiving a number of I/O cards, for example PCI cards, which also form FRUs. As can be seen in FIG. 2B, three power supply FRU modules can be received in the rear face of the chassis 31 for providing N+1 DC power redundancy. Four fan tray FRU modules can also be received in the rear face of the chassis 31. It will be appreciated that FIG. 2 represents a lower end system compared to that shown in FIG. 1. For example, in the computer server system illustrated in FIG. 2, it is envisaged that between 2 and 8 processors could be provided mounted on the two system boards and that up to 128 Gbytes of memory could be provided. It will also be noted that switch interconnect boards are not shown in FIG. 2. In this example the switch interconnect circuitry is instead mounted on a midplane, or centerplane, within the system.

Figure 3A:
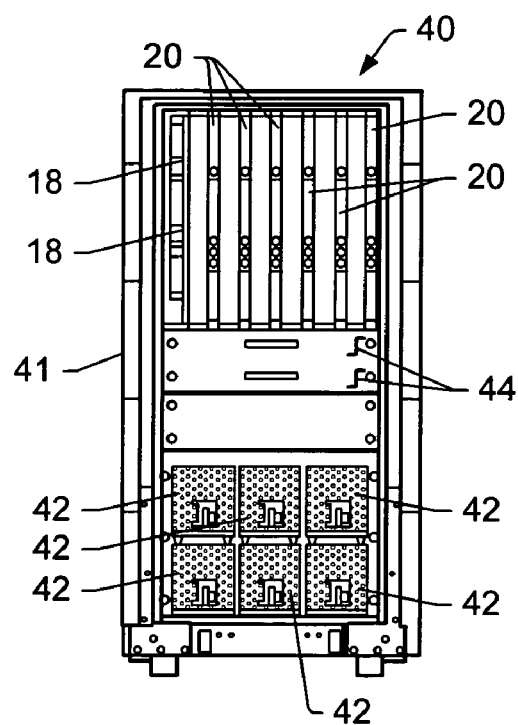
FIG. 3, formed from FIGS. 3A and 3B is a schematic illustration of a third computer system.
Figure 3B:
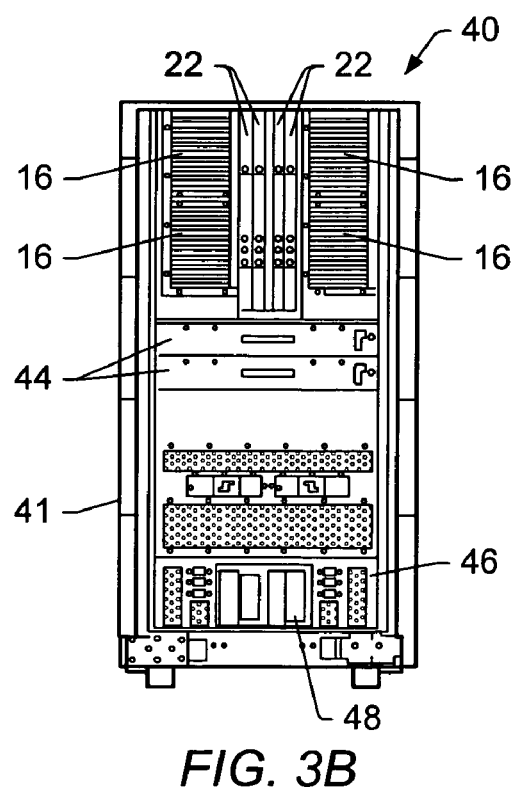

FIG. 3 illustrates yet another example of a computer server system 40 in which the present invention maybe implemented. FIG. 3A illustrates a front view of the computer system 40 mounted in a rack 41. FIG. 3B illustrates the rear view of that system.

As shown in 3A, up to six FRU modules in the form, of system boards 20 are mountable in the front face of the rack 41. Up to two FRUs in the form of system controller boards 18 are also mountable in the front face. Up to six power supply FRU modules 42 and up to two fan tray FRU modules 44 are also mountable in the front face of the rack 41.

FIG. 3B illustrates up to four FRU modules in the form of I/O boards 16 received in the rear face of the rack 41. The I/O boards 16 are configurable to provide various I/O card slots, for example up to 32 PCI I/O slots. Up to four FRUs in the form of switch interconnect boards 22 are also mountable in the rear face of the rack 41. Two fan tray FRU modules 44 are also illustrated in FIG. 3B, as are a redundant transfer unit FRU module 46 and a redundant transfer switch FRU module 48.

For example, here support can be provided for between 2 and 24 processors mounted on the system-boards 20 along with up to 384 Gbytes of memory. N+1 AC power redundancy can be provided. The system is also capable of receiving two separate power grids, with each power grid supporting N+1 DC power redundancy.

It will be appreciated that only examples of possible configurations for computer systems in which the present invention may be implemented are illustrated above. From the following description, it will be appreciated that the present invention is applicable to many different system configurations, and not merely to those illustrated above.

In the specific examples described, a high-speed system interconnect is provided between the processors and the I/O subsystems. The operation of the high-speed system interconnect will now be described with reference to FIG. 4.

Figure 4:
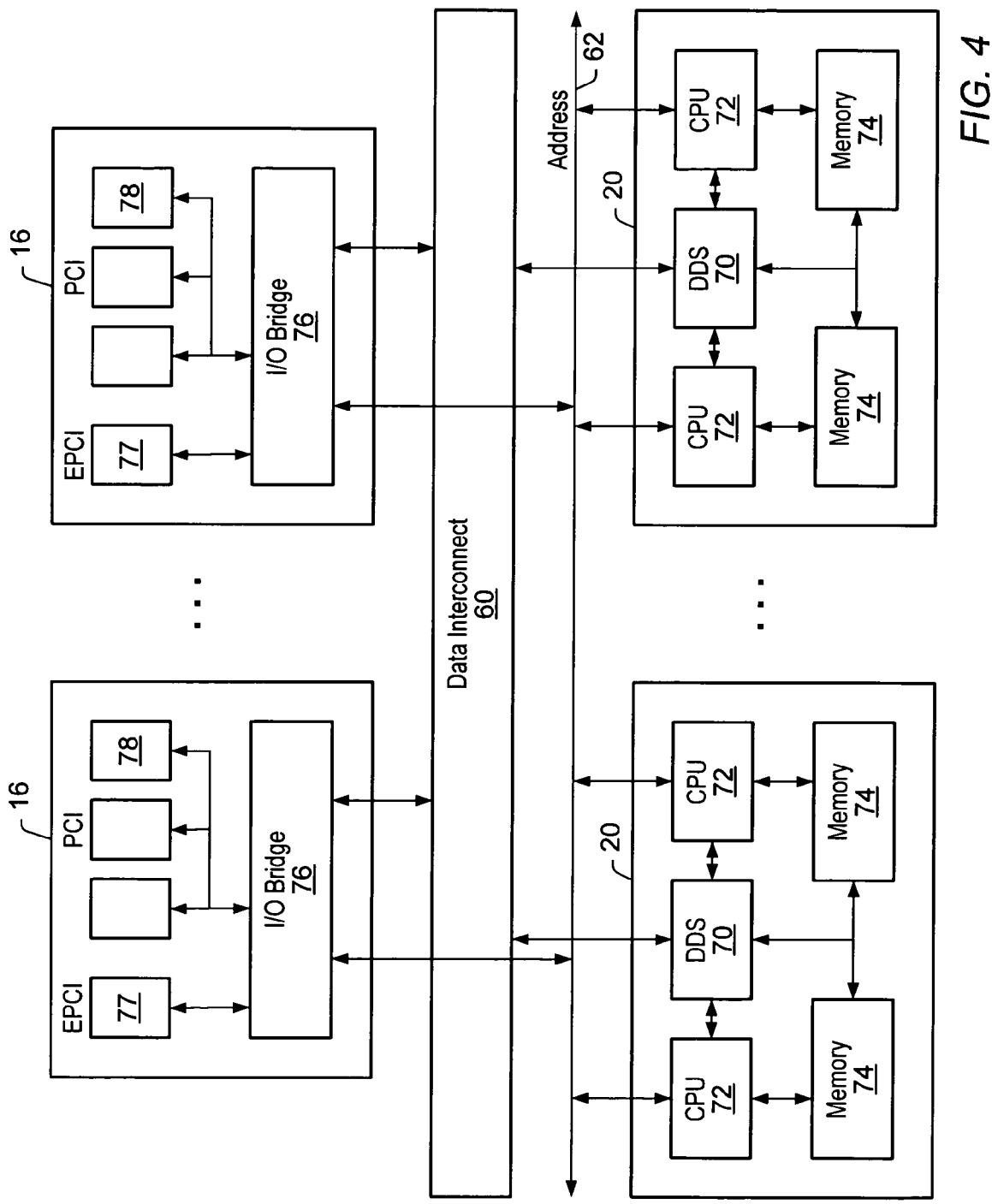
FIG. 4 is a schematic representation of an example of interconnections between system modules.

FIG. 4 illustrates the interconnection of the system boards 20 with the I/O boards 16 via a data interconnect 60 and an address interconnect 62. In the present example, a 288-bit data path with a high clock frequency (e g. 150 MHz) can be provided between the processors (CPUs) 72 and I/O bridges 76 on the I/O boards 16. The I/O boards 16 can support, for example, conventional PCI cards 78, and also, for example, enhanced PCI cards 77. Selected components within the system boards 20 are also illustrated, including, for example, a dual data switch (DDS) 70, two processors (CPUs) 72, and two blocks of memory 74, each block of memory being associated with a respective processor 72.

The connection between the interconnect devices (the processors 72, and the I/O bridges 76) and the data path uses a point-two point model that enables an optimum clocking rate for chip-to-chip communication). The processors 72 are interfaced to the data path using the DDS 70.

A snoopy bus architecture is employed in the presently described examples. Data that has been recently used, or whose impending use is anticipated is retrieved and kept in cache memory (closer to the processor that needs it). In a multi-processor shared-memory system, the task of keeping all the difference caches within the system coherent requires assistance from the system interconnect. In the present example, the system interconnect implements cache coherency through snooping. With this approach, each cache monitors the addresses of all transactions on the system interconnect watching for transactions that update addresses it already possesses. Because all processors need to see all of the addresses on the system interconnect, the addresses and command lines are connected to all processors to eliminate the need for a central controller. Address snooping is possible between processors across the DDS 70, between the pairs of processors 72 on the same system board, and between system boards using interconnect switches.

The arbitration of address and control lines can be performed simultaneously by all devices. This can reduce latency found in centralized bus arbitration architectures.

Distributing control between all attached devices eliminates the need for a centralized system bus arbiter.

Figure 5:
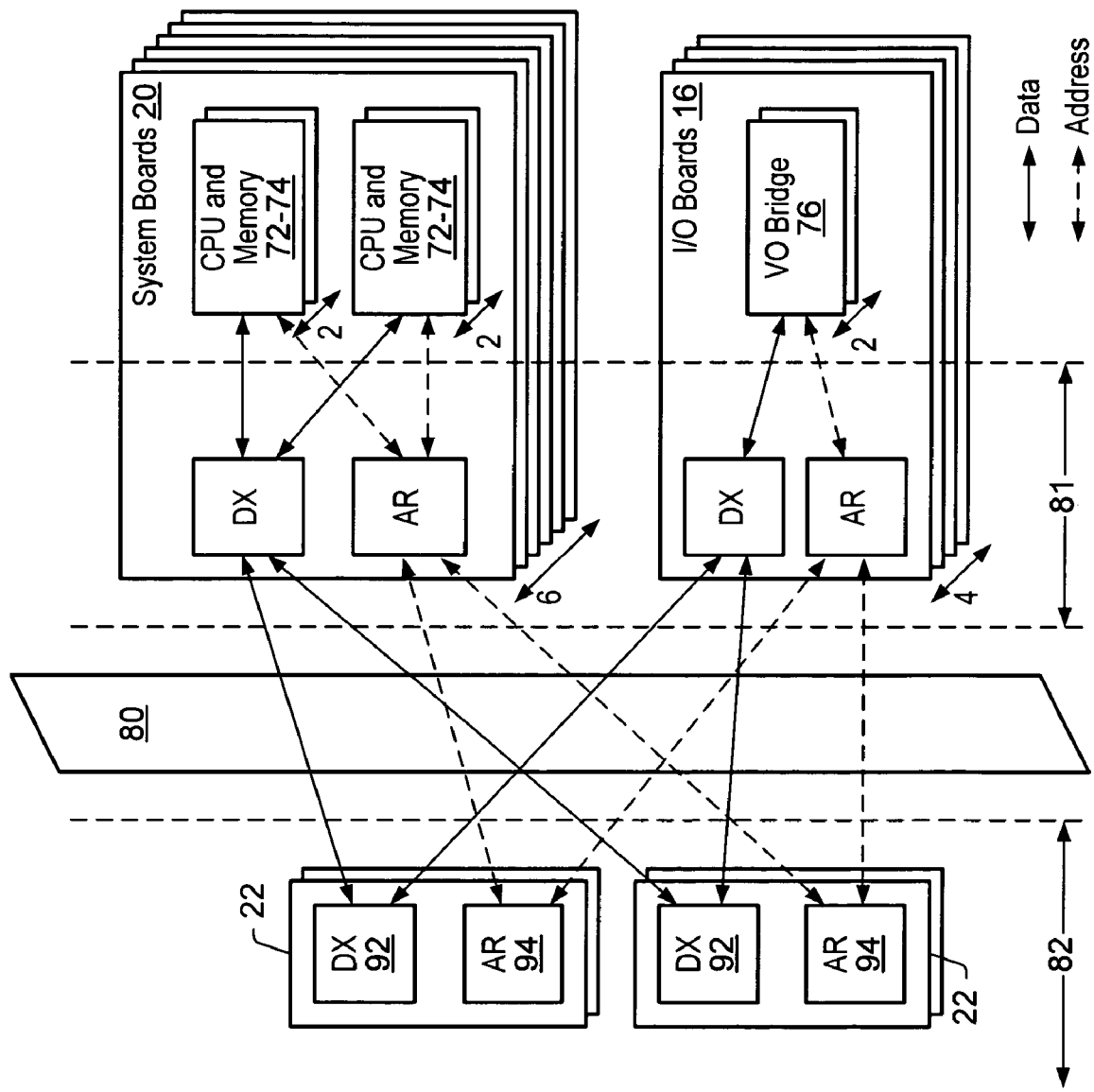
FIG. 5 is a schematic representation of an example of a two-level interconnect between system modules.

The operation of the system interconnect switches will now be described with reference to FIG. 5. The present architecture is designed with two levels of switches. One switch level 81 is incorporated into the system boards 20 and the I/O boards 16. The second level can be implemented as separate boards, for example as the switch interconnect boards 22 illustrated in the examples of computer server systems shown in FIGS. 1 and 3. Alternatively, the second level could be implemented, for example, on a motherboard or a centerplane. In an example of a computer system illustrated in FIG. 2, the second-level switches can be implemented on a centerplane (not shown in FIG. 2). The second level switches, whether implemented as independent interconnect switch boards 22, or on a centerplane or the like, include a data switch (DX) and an address repeater (AR). These can be implemented, for example, in one or more Application Specific Integrated Circuits (ASICs).

Transactions originating from the first-level switches 81 on the system boards 20 at the I/O boards 16 can be sent to the second-level switches 82. The second-level switches 82 can then direct the transactions to the correct board destination as is represented by the arrows in FIG. 5.

Figure 6:
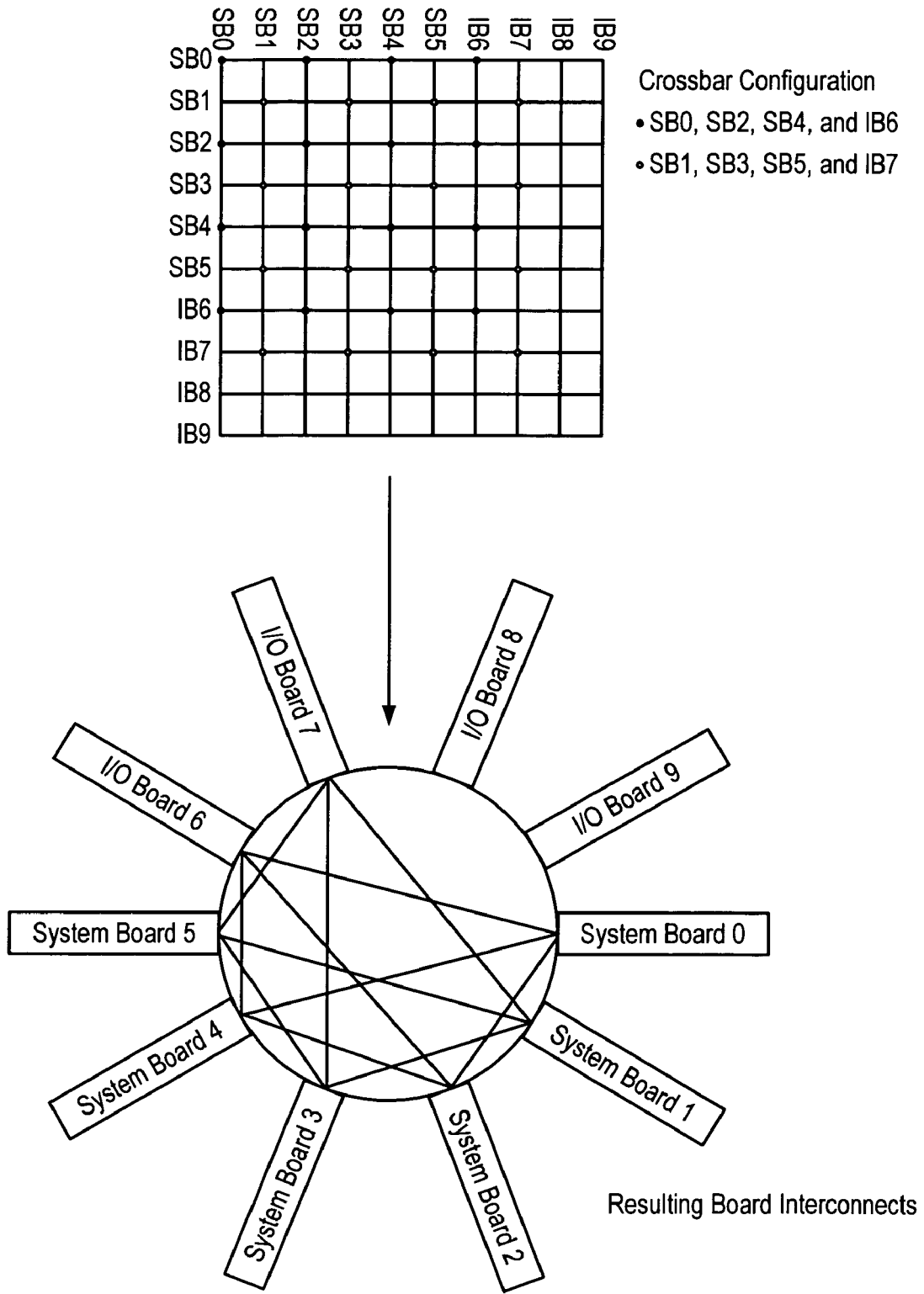
FIG. 6 illustrates examples of crossbar connections.

The system boards 20 and the I/O boards 16 only see messages to and from the boards in their own processor domain. FIG. 6 illustrates possible crossbar connections whereby the "crosses" in the crossbar are only enabled if their respective boards are in the same domain. The enables the domains to configure their busses independently. All components have access to all busses.

Figure 7:
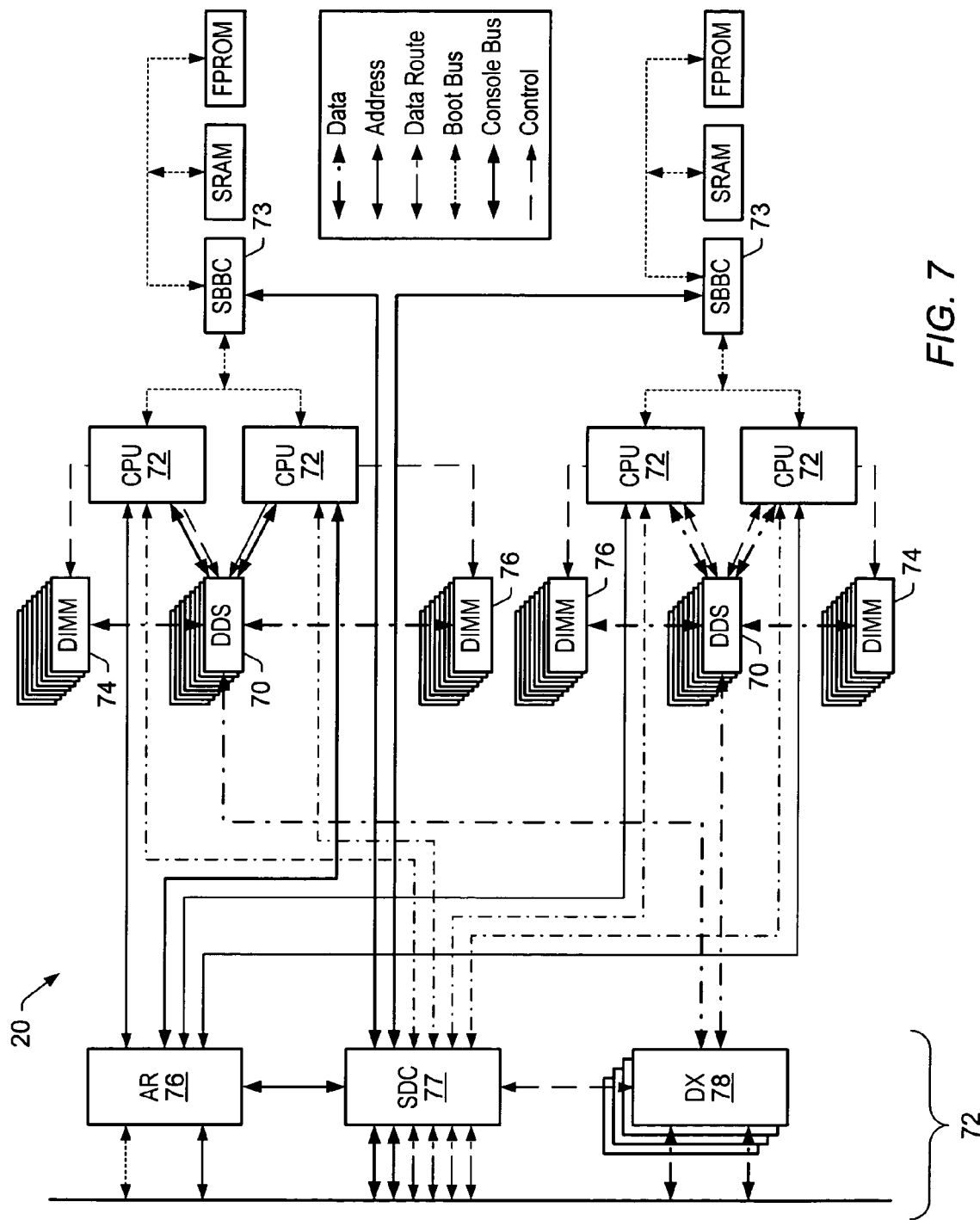
FIG. 7 is a schematic representation of an example of a system module.

FIG. 7 illustrates an overview of a system board 20. Each system board 20 can support up to four processors (for example for Ultra SPARC (TM) processors). Each processor can support two banks of memory, and each memory bank can include, for example, four Dual In-line Memory Modules (DIMMS) 74. The server architecture can support mixed processors, whereby the processors on different boards may have different clock speeds. The processors can include external cache (E cache). The processors 72 and the associated memory 74 are configured in pairs on the system boards 20 and are interconnected with a dual data switch (DDS) 70. The DDS 70 provides a data path between the processors of a pair and between processor pairs and the switch interconnect.

As mentioned above, the system board also contains first-level switch interconnect logic in the form of an address repeater (AR) 76 and a data switch (DX) 78, which can provide a means for cache coherency between the two processor pairs and between the system board and the other boards in the server using the switch interconnect. The address repeater 76 and the data switch 78 can be implemented by one or more ASICs. Each system board also contains a system data controller (SDC) 77, which can also be implemented as an ASIC. The SDC 77 multiplexes console bus connections to allow all system boards 20 and switch interconnect boards 22 to communicate to each of the system controller boards 18. A system boot bus controller (SBBC) 73 is used by the system controllers on the system controller boards 18 to configure the system board 20. It will be noticed that a static random access memory (SRAM) and a field programmable read only memory (FPROM) are connected to the SBBC 73.

Figure 8:
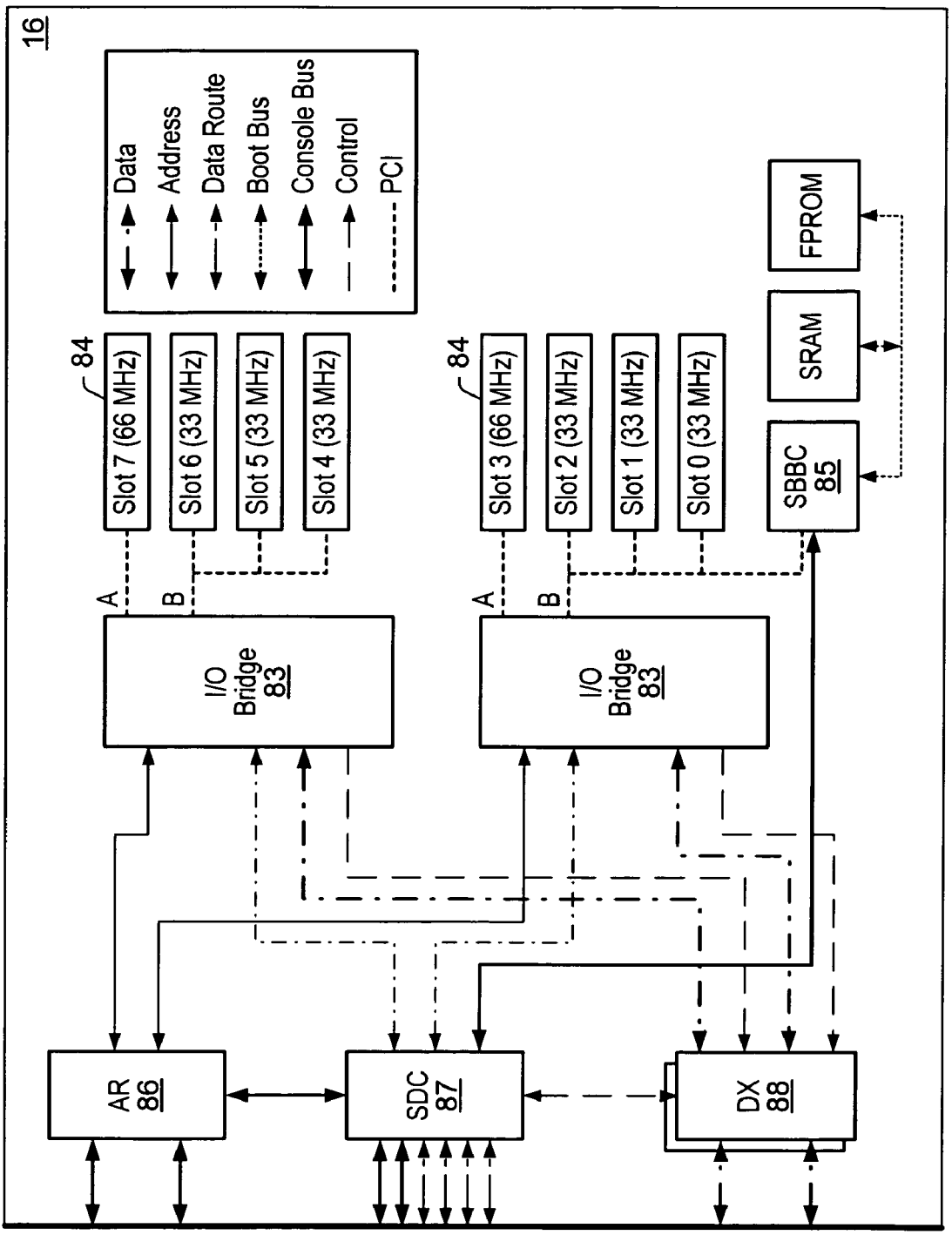
FIG. 8 is a schematic representation of an example of an I/O module.

FIG. 8 illustrates the major data structures in an I/O board 16. The I/O boards can be attached to a centerplane in the server computer system. Each I/O board 16 is self-contained and hosts a number of I/O cards.

The I/O board can include by two I/O bridges 83. On the server side, each I/O bridge 83 interfaces to the system interconnect. On the I/O side, each I/O bridge 83 provides respective I/O busses, for example in the present case two PCI buses. A first (A) bus has an enhanced PCI (EPCI) logic supporting one enhanced PCI card. The second (B) bus can have standard PCI logic supporting multiple standard PCI cards.

Each I/O board 16 can contain a system data controller (SDC), which can be implemented as an ASIC, and is used to multiplex console bus connections to allow all system boards to communicate to the system controllers on the system controller boards 18. A SBBC 85 can be used to configure the I/O board 16.

The I/O board also contains first level switch interconnect logic in the form of an address repeater 86 and a data switch 88, which can also be implemented as one or more ASICs. The first level switch interconnect switching logic provides an interface to the switch interconnect described above.

The architecture of the examples of computer systems shown in FIGS. 1-3 is designed to support two integrated service processors (or system controllers). These system controllers are implemented using the system controller boards 18. The integrated system controllers can perform functions including:
  providing a programmable system and processor clock;
  setting up the server and coordinating a boot process;
  monitoring environmental sensors;
  indicating the status and control of power supply;
  analyzing errors and taking corrective action;
  providing server console functionality;
  providing redundant system controller board clocks;
  setting up server segments (partitions) and domains;
  providing a centralized time-of-day; and
  providing centralized reset logic.

Figure 9:
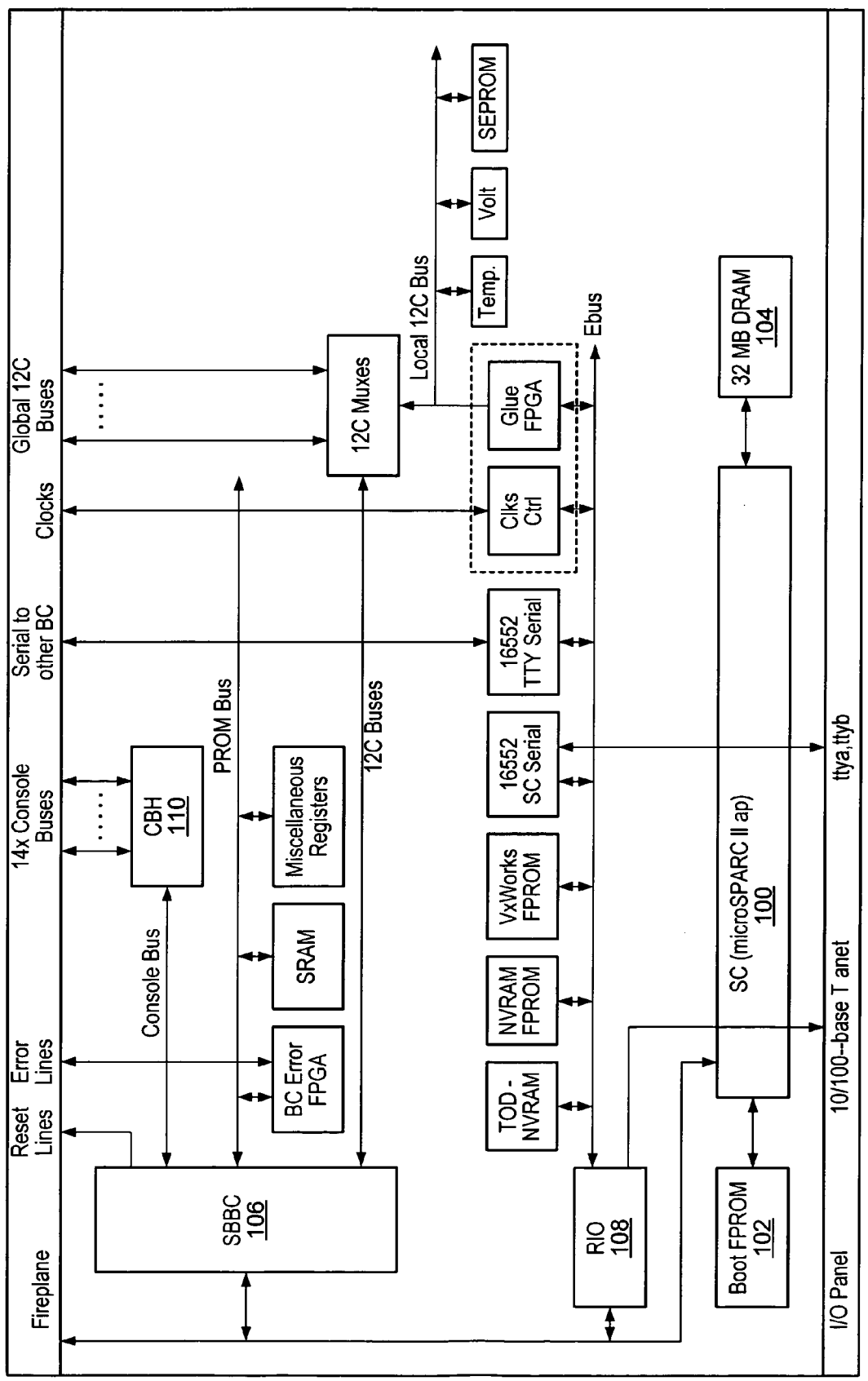
FIG. 9 is a schematic representation of an example of a system controller module.

FIG. 9 illustrates an example of a system controller board 18. Each system controller board 18 contains a console bus hub (CBH) 110. The CBH interconnects the system controller to the console bus, which, in turn, is connected to the system boards 20, the I/O boards 16 and the switch interconnect boards 22.

The console bus is a broadcast medium for commands and data packets. This allows the system controller to configure and test the various components in the server by reading and writing registers on each of the system boards 20.

As mentioned above, each of the system board 20, the I/O board 16 and the switch interconnect board 22 contains a SDC, which multiplexes console bus connections to allow each of these boards to communicate with the currently active system controller.

One of the system controller boards 18 acts as a primary system controller board and provides a server clock and server control/monitoring logic.

A global maintenance bus structure is used to monitor the environmental integrity of the server. The monitoring structure is under the control of the system controller and uses the I2C bus structure. The I2C bus can be operable to monitor server voltages, temperatures, fan speeds, etc. The I2C bus also functions as the read/write bus for field replaceable units (FRU) identities (FRUIDs). Each of the FRUs include storage, for example an electrically erasable programmable read only memory (EEPROM), for receiving the FRUID and other data.

As mentioned above, one of the system controller boards 18 operates as a primary system controller board. The other system controller board 18 operates as a redundant system controller board, and is used to provide a backup system clock and backup services if the primary system controller board fails.

Any suitable algorithm can be used to determine which of the system controller boards is to act as the primary. For example, the system could default to the system controller board in slot zero acting as the primary.

Figure 10:
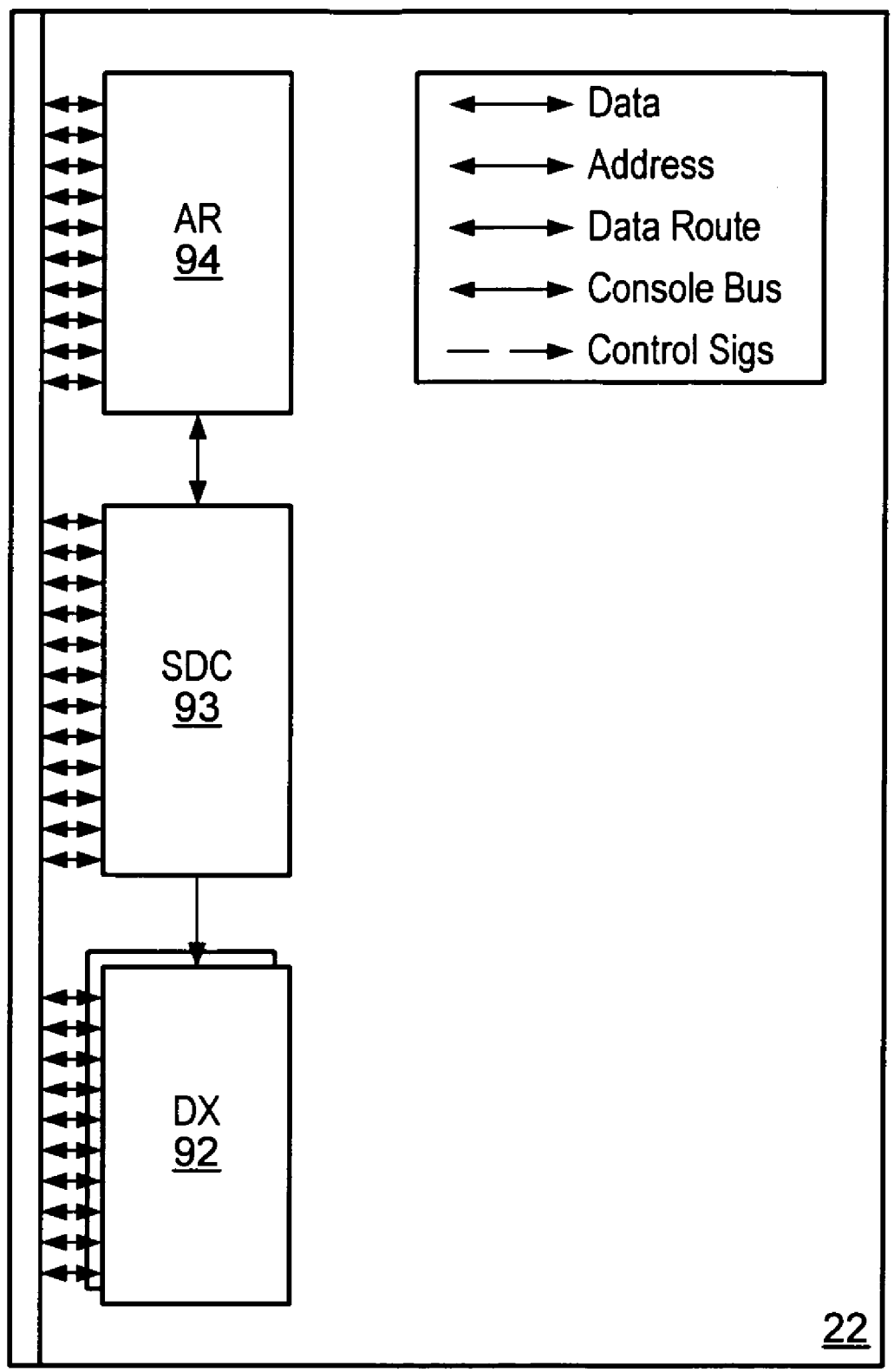
FIG. 10 is a schematic representation of an example of a switch interconnect module.

FIG. 10 illustrates a switch interconnect board 22. As well as the DX 92 and AR circuits AR 94 represented in FIG. 5, it will be noted that an SDC 93 is included that provides functionality similar to that of the SDC 77 of the system board 20 illustrated in FIG. 7 and the SDC 87 of the I/O board 16 illustrated in FIG. 8.

Figure 11:
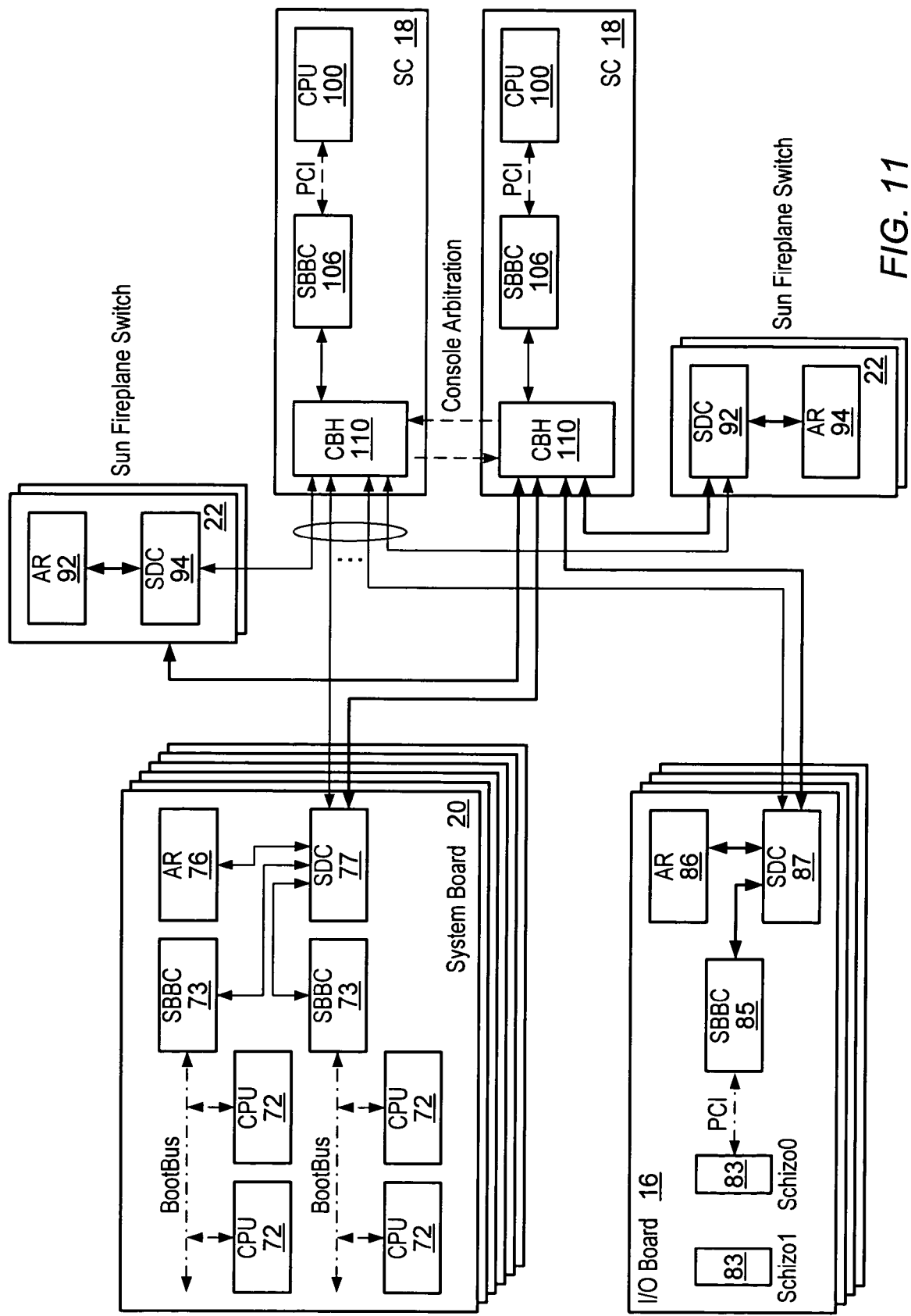
FIG. 11 is a schematic representation of an example of interconnections between the modules of FIGS. 7 to 10.

FIG. 11 illustrates the connections between the system controllers, the console bus, and the SDC 77 in the system board 20, the SDC 87 in the I/O board 16 and the SDC 94 in the switch interconnect board 22.

When power is turned on to the server system, the system controller operating system boots and then starts a system controller application remembers a domain configuration from when the server was last powered off, and builds the same configuration again. It then turns on system boards, tests them, and attaches the boards together into domains. It then brings up the operating system environment in each domain and starts the configured domains. It manages the hardware side of the domain configuration, and then continuously monitors the server environment.

The various FRU modules described above, are interconnected by one or more centerplanes. The number of separate centerplanes can be varied according to a particular model. In some systems, the centerplane can be a passive component, with no active components thereon. Alternatively, the system centerplane can be an active centerplane containing at least some circuitry. Thus, for example, in the example of the system shown in FIG. 2, switch interconnect board circuitry and logic is provided on the centerplane.

The centerplane can also carry an ID board (not shown). This can be pre-programmed daughter board on the server centerplane, and can contain an EEPROM.

The EEPROM can include information such as a server chassis ID, a server serial number/host ID, media access controller (MAC) addresses for the server and, also, server and component power-on hours. This ID board can be considered as a single FRU.

As mentioned earlier, the server systems can be provided with redundant power supplies, with appropriate power connections being provided from the PSUs over the centerplane(s) to the mounted FRUs.

The systems described with reference to FIGS. 1-3 include fan trays or blower assemblies that provide redundant cooling if one fan tray or blower assembly fails.

The number of fan trays and the configuration of the fan trays can be adapted to suit the physical configuration and power requirements of the individual server systems.

Other FRUs can be provided, as appropriate, in the systems described above. Thus, for example, media trays for receiving removable or fixed media devices can also be provided. Also sub-assemblies and separate components can (e.g. DIMMs) can be configured as FRUs.

Each FRU is provided with a FRUID EEPROM as described above. The EEPROM is split into two sections, of which one is read-only (static) and the other is read-write (dynamic). The static section of the EEPROM contains the static data for the FRU, such as the part number, the serial number and manufacturing date. The dynamic section of the EEPROM is updated by the I2C bus with power-on hours (POH), hot-plug information, plug locations, and the server serial number. This section of the EEPROM also contains failure information if the FRU has an actual or suspected hardware fault, as will be described later. This information is used the service controller to analyze errors and by repair centers to further analyze and repair faults.

Also the circuitry in the FRUs is provided with error registers for recording errors. The registers can be configured to record first errors within a FRU separately from non-first errors At least some of the FRU circuitry can be implemented as Application Specific Integrated Circuits (ASICs), with the registers being configured in the ASIC circuitry in a conventional manner. The FRUs can also be provided with further circuitry (e.g., in the form of a Field Programmable Gate Array (FPGA)) that is responsive to the error signals being logged in the ASIC registers to report the presence of such error signals to the system controllers.

The FRU circuitry follows a standard error reporting policy. Where the circuitry comprises one or more ASICs, each ASIC can have multiple error registers. There—can be one error register per data port and one error register per console port, as well as other error registers. Each error register's bit 15 is First Error (FE) bit. The FE bit is set in the first error register in the ASIC that has an unmasked error logged and all subsequent errors will not set the FE bit in any other register in the ASIC until the FE bit is cleared in all registers in that ASIC. However, if multiple registers log an error simultaneously, then the FE bit could be set in multiple registers. The existence of an FE bit that is set prevents the other FE bits in the chip from being set. If the FE bit that is set in a device is cleared before the individual error bits are cleared in other error registers in the chip, the FE bit will be set again in the other registers. Each error register can be divided into two sections of 15 error bits each: [30:16] and [14:0]. Masked errors for that registers and the first unmasked error (or multiple first unmasked errors if they occur in the same cycle) for that register can be reported in the [14:0] range. Subsequent errors (masked or unmasked) will be accumulated in the [30:16] range. In the present example, the convention for the error bits is RW1C (read, write one to clear). Thus, appropriate error bits are recorded, in a conventional manner, in registers in the ASICs when errors occur.

The examples of the server systems described with reference to FIGS. 1-3 can be organized into multiple-administrative/service layers. Each layer can provide a set of tools or configure, monitor, service and administer various aspects of the server system.

Figure 12:
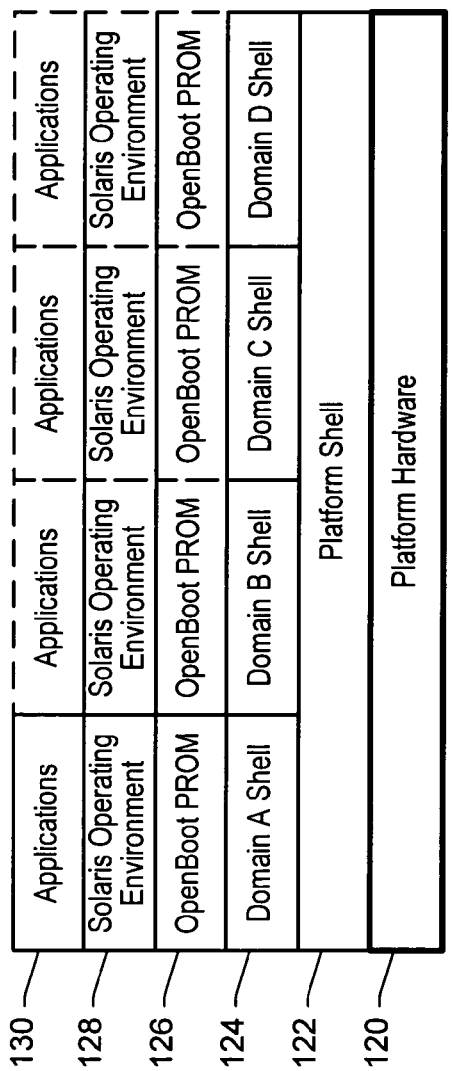
FIG. 12 is a schematic representation of a system architecture.

FIG. 12 illustrates an example of such a layered structure. Thus, as shown in FIG. 12, above a platform hardware level, a platform shell level 122 is defined. Above the platform shell level 122, a further shell level is defined for each processor domain within the system. Above each domain shell level 124, an Open Boot PROM layer 126 is defined. Above the Open Boot PROM level 126 is defined. Above the Open Boot PROM level, an operating environment 128 layer (e.g. for a Solaris operating system) is defined. Above the operating environment layer 128, applications 130 are then defined. It will be appreciated that the foregoing description was directed generally to the platform hardware level 120.

Once the system server hardware has been configured as described above, platform configuration parameters can be set for level 120 using software provided on the system controller. The system controller software provides system administrators and service personnel with two types of shells with which to perform administrative and servicing tasks. These shells form the platform shell 122 and the domain shells 124.

Using the platform shell 122, it is possible to: configure the system controller network parameters; configure platform-wide parameters; configure partitions and domains; monitor platform environmentals; display hardware configuration information; power on and power off the system and system components; set up hardware level security; set a time of day clock; test system components; blacklist system components; configure the platform for Capacity-On-Demand (COD) software; and update the system firmware.

The platform shell 122 can be configured using the console capability provided through the system controller board. Access can be achieved through a serial port console connection, or an Ethernet port shell connection. It is possible to configure network parameters for the system controller and also to define Power On Self Test (POST) parameters.

With regard to the domain shell layer 124, it is to be noted that the examples of the server computers illustrated in FIGS. 1-3 can be split into multiple segments (also known as partitions) and multiple domains. Both provide means of dividing a single physical system into multiple logically independent systems, each running its own operating system environment (e.g. a Solaris operating system environment). The system controller provides a shell interface for each defined domain to perform administrative and servicing tasks. It is this shell interface which forms the respective "domain shells" represented at 124 in FIG. 12.

With a domain shell, the following functions can be performed: add physical resources to a domain; remove physical resources from a domain; set up domain level security; power on and power off domain components; initialize a domain; test a domain; and configure domain-specific configuration parameters.

The term segment refers to all, or part, of the system interconnect. Placing the platform in dual-partition (segment) mode results in splitting the system interconnect into two independent "snoopy" coherent systems.

When a platform is split into two segments, the interconnect switchboards are divided between the two segments, causing the platform to behave as if each system were physically separate.

Segments can be logically divided into multiple sections called domains. Each domain runs its own operating system environment and handles its own workload. Domains do not depend on each other and are isolated on the system interconnect.

Adding new domains can be useful for testing new applications or operating system updates, while production work continues on the remaining domains. There is no adverse interaction between any of the domains, and users can gain confidence in the correctness of their applications without disturbing production work. When the testing work is complete, the domains can be rejoined logically without a system reboot. Each domain will contain at least one system board 20 and at least one I/O board 16 with enough physical resources to load the operating system environments, and to connect to the network. When the domains are initialized, the system boards 20 and the I/O boards 16 are connected to the interconnect switchboards to establish a "snoopy" coherent system.

Figure 13:
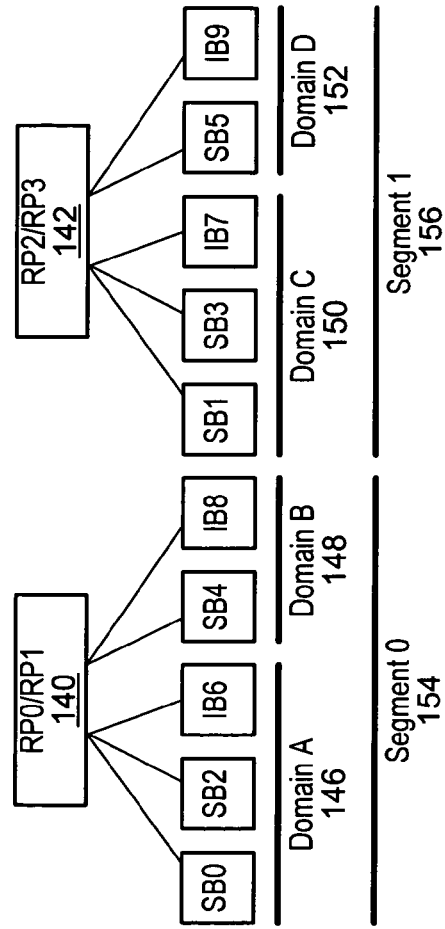
FIG. 13 illustrates a configuration providing multiple processor domains.

FIG. 13 illustrates an example of a server system configured with four domains, 146, 148, 150 and 152. Domains 146 and 148 form part of a first segment 154 with respect to switch interconnect, or repeater boards RP0/RP1 140. Domains 150 and 152 are configured in a second segment 156 with respect to switch interconnect, or repeater boards RP2/RP3 142. The total number of domains can depend on a particular model or server and the number of segments configured on that server.

The OpenBootPROM (OBP), identified as level 126 in FIG. 12, is a firmware layer that is responsible for identifying available system resources (disks, networks, etc) at start-up time. When the operating system environment boots, it uses this device information to identify the devices that can be used by software.

After the system, or domain, completes its power-on self-test (POST), available healthy devices are attached to a host computer through a hierarchy of interconnected buses. Open Boot represents the interconnection buses and their attached devices as a tree of nodes. This tree is called a device tree. A node representing the host computer's main physical address bus forms the tree's root node.

Each device node can have properties (data structures describing the node and its associated device), methods (software procedures used to access the device), data (initial values of the private data used by the methods), children (other devices "attached" to a given node and lying directly below it in the device tree) and a parent (the node that lies directly above a given node in the device tree).

Nodes with children usually represent buses and their associated controller, if any. Each note defines a physical address space that distinguishes the devices connected to the node connected to the node from one another. Each child of that node is assigned a physical address in the parent's address space.

Nodes without children are called leaf nodes and generally represent devices. However, some nodes represent system-supplied firmware services. Open Boot deals directly with hardware devices in the system. Each device has a unique name representing the type of device and where that device is located in the system addressing the structure.

Figure 14:
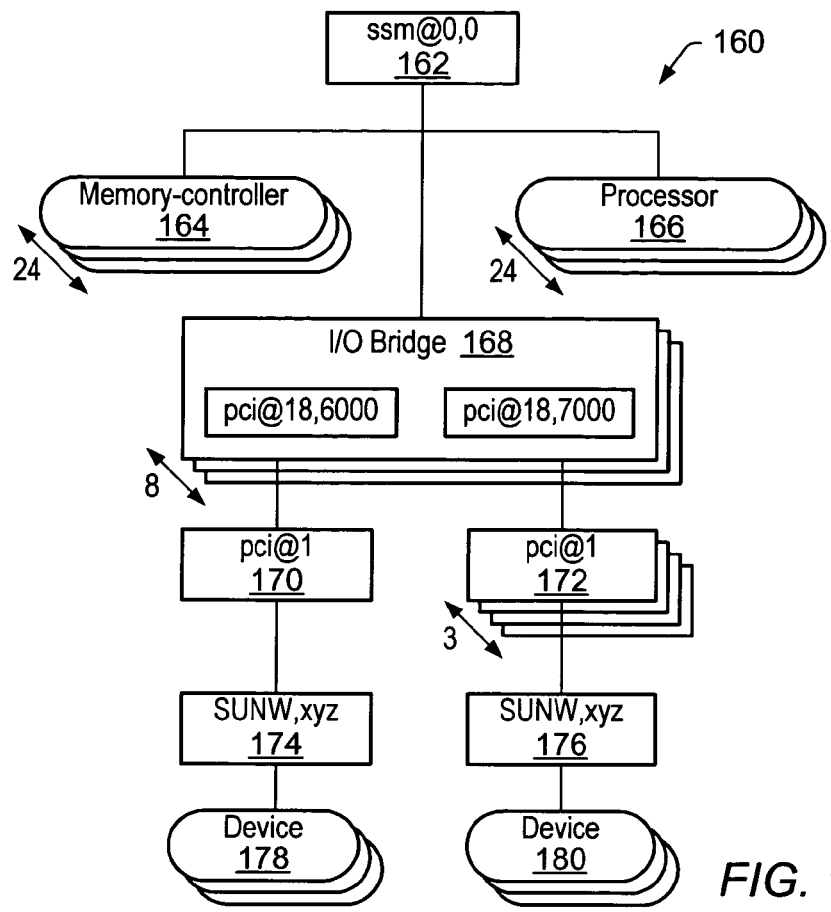
FIG. 14 is a schematic representation of a system configuration hierarchy.

FIG. 14 illustrates some of the components of a simplified representation of such a device tree. As mentioned above, a root node 162 represents the host computer's main physical address bus. Child leaf nodes 164 and 166 represent memory-controllers and processors, respectively. A child node 168 represents the I/O bridges 76 shown in FIG. 4. Further nodes 170 and 172 which are children of the node 168 define PCI slots within the I/O bridge. Child nodes 174 and 176 of the nodes 170 and 172, respectively, represent respective I/O controllers. Leaf nodes 178 and 180 which form child nodes of the nodes 174 represent respective devices.

With regard to physical device mapping, a physical address generally represents a physical characteristic unique to a device (such as a bus address or slot number where the device is installed). The use of a physical address to identify a device prevents device addresses from changing when other devices are installed or removed. Each physical device is referred to by its node identifier and an agent identifier (AID). When providing system board mapping, account is taken of the number of possible components within a given system organization. Thus, with regard to the example shown in FIG. 1-3, it will be noted that there can be up to six system boards, depending on the model, with each system board having up to four processors. Each system board also contains up to eight banks of memory, with two banks per processor. Each pair bank is controlled by one memory management unit, which is co-packaged with its respective processor. Accordingly, the AID for an MMU can be the same as the processor AID, but with a different offset.

Similarly, for configuring other components such as mappings for I/O, the numbers of the various components is taken into account when determining that mapping.

The operating system environment (in the present examples a Solaris (TM) operating environment) 128 can support a wide variety of native tools to help monitor system hardware configuration and health. In, for example, a Solaris 8 operating environment, system components can be referenced using logical device names (names used by systems and administrators and software to access system resources), physical device names (names that represent the fill device path name and the device information hierarchy (or tree) and instance names (the kernel's abbreviated names for each possible device on the system). Logical device names are symbolically linked to their corresponding physical device names. The logical names are located in a directory and are created at the same time as the physical names. The physical names are located in a different directory where entries are created during installation or subsequent automatic device configuration or by using a configuration command. The device file provides a pointer to the corresponding kernel device drivers. In the Solaris 8 operating environment, the instant name is bound to the physical name by specific references. A specific utility can be used to maintain the directories for the logical and physical names.

The primary responsibility for the collection, interpretation, and subsequent system responsive actions regarding error messages lies with the system controller(s). Each system controller receives error messages from each of the boards in a domain, that is, the system boards 20, the I/O boards 16 and the switch interconnect boards 22. Each of these boards drives two copies of any board error messages per domain, one to each system controller board. The system boot bus controller (SBBC) 106, located on the system controller board 18 (see FIG. 9), determines the action to take on the errors.

Typical actions can include: setting appropriate error status bits; asserting error pause to stop further address packets; and interrupting the system controller.

At this point, the system controller software takes over, reading the various error status registers to find out what happened. After detecting the cause of the error, the system controller might decide whether the error is recoverable.

If the error is recoverable, the system controller could potentially clear the error status in the appropriate registers in the boards that detected the error. If the error is not recoverable, the system controller might decide to reset the system. Error signals, error pause signals, and reset signals can be isolated per partition and domain so that errors in one partition or domain do not affect other partitions or domains.

The system controller does not have permanent storage of errors, warnings, messages, and modifications. Instead, these items are stored in a circular buffer, which can be viewed using a specific command in either the platform or domain shells.

Additionally, there, can be a host connection to the system controller using Ethernet, as well as a host option when using a remote management center.

The identification of a probably failed FRU can be based on the class of the error. Errors generally fall into two classes, that is domain errors and environmental errors. Domain errors can typically apply to physical resources that can be assigned to a partition, domain, or both, such as the system boards 20, the I/O boards 16, and the switch interconnect boards 22. Domain errors can also apply to the bus structures. Environmental errors can typically apply to physical resources that are shared between domains, such as power supplies and fan trays. Environmental errors can also include overtemperature conditions.

Tables can be maintained by the system controller to relate the types of errors to the FRUs that are probably responsible for those errors.

An example of information that might be included in such a table is set out in Table 1 below:

TABLE 1

| ERROR CLASS | PROBABLY FAULTY FRU |
|---|---|
| Domain | |
| Console bus | |
| Parity | The target board, the system controller, or the centerplane. |
| Time-out | The target board, the system controller, or the centerplane. If the clocks or the voltage AC levels on the target board are bad, then most likely it is the target board. |
| Protocol | The target board, the system controller, or the centerplane. |

TABLE 1-continued

| ERROR CLASS | PROBABLY FAULTY FRU |
| --- | --- |
| Interconnect | |
| Internal Interconnect | Replace the FRU indicated by the error The board containing the L1 interconnect switch/board indicated by the error, the L1 interconnect switch/board at the other end of the link, or the centerplane. Verify whether or not the errors move with the L1 interconnect switch/board when moved to another slot. For the Data switch (DX) incoming parity errors, if parity was corrupted inside L1DX before the packet was transmitted to the interconnect switch board, then the L1DX logs an internal parity error while the interconnect switch board logs an incoming parity error. In this case, the failed FRU is L1 the transmitting board. |
| AR ASIC | |
| Switchboard check errors Interconnect port queue overflow or underflow | The board containing the L1 interconnect switch, both interconnect switch boards, or the centerplane. For interconnect switch board overflows or underflows: one of the interconnect switch boards, the board containing the L1 interconnect switch logic attached to the port, or the centerplane. For L1 interconnect switch overflows: the board containing the L1 interconnect switch logic, the processor, or a processor connection. |
| AR transaction count underflow or overflow | An internal ASIC or L1 and L2 link failure. If an L1 and L2 failed link is the cause, then there should also be L2 check errors. The failed FRU might be the board itself, one of the other L1 domain boards, or the centerplane. |
| System data controller ASIC | |
| DtransID arbitration | The CPU, the CPU socket, or the centerplane. |
| TtransID and TargID arbitration | The system board for a local interconnect port, the interconnect switch board, or the centerplane for an inbound interconnect port. |
| DtransID ID | The system board. |
| TtransID and TargID ID | The system board for a local interconnect port, the system board, the interconnect switch board, or the centerplane for incoming interconnect port. |
| DtransID Queue overflow | The system board. |
| TtransID and TargID Overflow | A secondary error tied to TtransID and TargID arbitration. |
| TtransID and TargID L2 Parity | The system board for a local interconnect port, the system board, the interconnect switch board, or the centerplane for incoming interconnect port. |
| Parity single | The system board. |
| Parity bidirectional | The system board for a local interconnect port; the system board, the interconnect switch board, or the centerplane for incoming interconnect port. |
| DX ASIC | |
| Interconnect or I/O Bridge FIFO overflow or underflow | Possibly the system data controller on same board; if flow-control problems are evident, then problem could be off-board. |
| SBBC ASIC | The system board (a failed CPU or CPU socket). |
| BootBus not idle | The system board (a failed CPU or CPU socket). |
| CBH ASIC | Refer to console bus errors with one exception: a console bus arbitration error can be caused by software if the second system controller sets its arbitration bit and forces control of the bus to itself. |
| DDS, ASIC | The system board. |
| System clock | The system controller (0 or 1) or the centerplane. |
| Ecache | The system board. |
| L1 Interconnnect switch ECC | The failed FRU might not be identified depending on the ECC error detected and whether it can be associated with any other ECC errors. L1 checkers provide the following: DtransID-ID of target interconnectdevice Syndrome-9 bit interconnect syndrome Outbound or inbound Read, write-read, or write transaction Correlate preceding data against other ECC errors detected by L1 ECC checkers to attempt to determine the source of the error. There are many scenarios involving different sources and destinations for memory and where the memory gets corrupted. |
| Interconnect - interconnect device on same DX port (same board) | The system board. |
| Interconnect - interconnect device on other DX port (same board) | The system board. |

TABLE 1-continued

| ERROR CLASS | PROBABLY FAULTY FRU |
|---|---|
| Interconnect - interconnect device on different boards | If DX port detects outbound ECC error whose Dtrans is targeted to another board and an ECC error is detected on the target board, then the faulty FRU is sourcing board. If a DX port detects an inbound ECC error but no board sources the error, examine the data path for possible parity errors. If parity errors have occurred, then the devices involved in the interconnect link are suspect. If no parity errors occur in the data path, then the interconnect switch board is the failed FRU. |
| Environmental | |
| Over-temperature | These errors can be attributed to several sources: failed fans, an overheated room, or disrupted air flow. The software should detect failed or missing fans and indicate to replace those FRUs, however the system controller cannot determine the room temperature and also whether filler panels are replaced when boards are removed. |
| DC-DC converter | The system or interconnect switch board on which the converter resides. |
| Power supply | With the exception of AC line input failure, the power supply itself. |
| Fan failure | An associated fan tray. |

It will, however, be appreciated that more and/or different information can be used in such Tables, dependent upon specific requirements, Table 1 being merely given as an example of the type of information to be held in the tables. In any particular implementation, the specific, information stored can be derived from the configuration in interrelationships of the components of the system.

As discussed in the introduction, a conventional server system relies on a Power On Self Test (POST) utility, or the like, to try to recreate and diagnose an error.

However, such an approach is only viable for a limited range of errors and is not as reliable as would be desired. Accordingly, it can happen that the error is not cleared and the system then loops, requiring the manual intervention of a service engineer. When the service engineer responds to an outage, he or she typically has to start from scratch by analyzing the various error messages and manually diagnosing the problem. Often the engineer responds by swapping out a set of components to keep the customer happy. However, this is clearly less than ideal as this then leads to more components being replaced that are necessary, and also increases costs at the repair depot for testing components that are in fact healthy. The end result can be a high NTF (No Trouble Found) rate at the repair depot.

In contrast to the typical situation, an auto diagnosis engine is provided to diagnose the first instance of the error occurrence and to record component health status (CHS) information of the faulty or suspect components in storage in the field replaceable unit concerned. For example, CHS information indicating whether a component is faulty or suspected as being faulty can be stored in a dynamic part of a memory component used to store a field replaceable unit identity (FRUID), along with the diagnostic reason of why this was marked as faulty or suspect. POST can then use the CHS information to deconfigure these components out of the system. This can therefore result in a domain being effectively restored without the user having manually to diagnose and repair the domain. Since the fault has been isolated, the customer will not face the same problem again, thus resulting in increased availability. POST can still perform diagnosis, but in an embodiment of the invention, as a result of the auto diagnosis performed, POST becomes determinative, being able to use fault information recorded as a result of that auto diagnosis.

Also, the auto diagnosis engine can make it easier for a service engineer to understand what went wrong and replace the components whose CHS has been marked as faulty. This can reduce service times and reduce costs as a result of a reduced NTF rate. The auto diagnosis engine can also save time and reduce costs at the repair depot. In the first place less healthy components would be returned to the repair depot due to better faulty component identification. Also, returned components will have been tagged as faulty by reason of the stored CHS information. This can therefore reduce the time returned parts are subjected to testing (which can typically be for long periods) before being deemed NTF or validated as faulty and will give the repair engineer a headstart in trying to replicate the error and either repair the component or scrap it.

Figure 15:
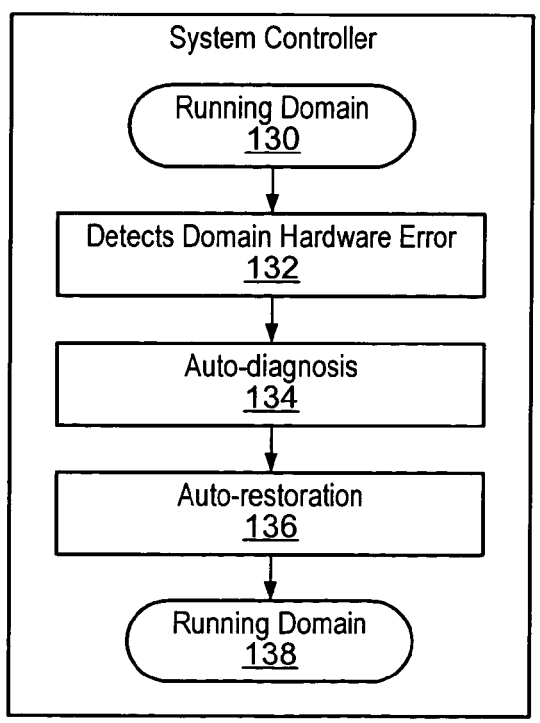
FIG. 15 is flow diagram giving an overview of an example of a method of recovering from a system error.

The system controller can be operable to perform diagnosis and domain restoration operations as summarized in FIG. 15. The system controller firmware includes the aforementioned auto diagnosis (AD) engine that detects and diagnoses hardware errors that affect the availability of a platform and its domains.

FIG. 15 commences at step 130 with a running domain.

In step 132, the system controller detects a fatal hardware error condition on a domain and pauses the domain.

In step 134, the auto diagnosis engine analyzes the hardware error and determines which FRUs are associated with the hardware error. The auto diagnosis engine can be operable to produce one of a number of results depending on the hardware error and the components involved.

For example, it could identify a single FRU that is responsible for the error. Alternatively, it could identify multiple FRUs that are responsible for the error. In this case, not all of the components listed may be faulty and the hardware error could be attributed to a smaller subset of the components identified. As a further alternative, it could indicate that the FRUs responsible for the error cannot be determined. This condition can be considered to be "unresolved" and to require further analysis by service personnel. The auto diagnosis engine records the diagnosis information for the affected components and maintains this information as part of the CHS for those components. The auto diagnosis engine can further be operable to report diagnosis information through, for example, platform and domain console event messages.

In step 136, auto-restoration is performed in which POST reviews the component health status of FRUs that were updated by the auto diagnosis engine. POST uses this information and attempts to isolate the fault by deconfiguring (disabling) any FRUs from the domain that have been determined to cause the hardware error. Even if POST cannot isolate the fault, the system controller then automatically reboots the domain as part of the domain-restoration process.

The system is then able to continue once more with a running domain at step 138.

The system controller can further be operable automatically to monitor domains for hangs when a domain heartbeat stops within a designated timeout period or when the domain does not respond to interrupts. The system controller can be arranged in this case automatically to perform an externally initiated reset (XIR) and to reboot the hung domain.

An embodiment of the invention can provide for improved management (detection, handling and recovery) of hardware errors in a computer system as described above.

In order further to illustrate the operation of an embodiment of the invention, an example of how a typical scenario is handled will be explained below.

Consider, for example, that the system described with reference to FIG. 3 is running with 2 domains in dual segment mode. If then, the interconnect switch in segment 0 becomes faulty, the domain in this segment will crash. This error can be detected by the system error monitor function of the service controller. This monitor in turn can call the auto diagnosis engine, which can diagnose an interconnect switch as faulty. The failure can be recorded in the EEPROM located on the switch board itself, and the reconfiguration engine can be invoked. In this particular case, the domain can be migrated to the other segment, and be brought up. All of this can happen automatically, so that downtime is minimized.

Integral to the handling of the hardware fault is fault isolation. It means that the faulty component can be removed from the configuration at any time without disruption. Replacement can happen while the system is running, and some resources can even be brought online without requiring a domain reboot, using dynamic reconfiguration (DR).

The auto-diagnostic engine (AD) resides on the system controller. Once the system controller detects hardware errors (correctable or uncorrectable), it first polls all related circuits in order to build a list of any errors detected in the system. The circuits enable first errors (FE) to be distinguished from non-first errors. The hardware also provides glue-chips (actually FPGA devices) which remember which board(s) asserted errors.

Once the service controller has collected this information, it calls the auto diagnosis engine. The auto diagnosis engine is operable to identify the very first error in the system, using the information provided by the hardware. Once this error has been identified, and using fault-tables, the AD is capable of generating a list of FRUs which could be faulty.

As mentioned earlier, the fault diagnosis result can be in 3 categories:

a single FRU is identified: this FRU is faulty.
multiple FRUs are identified: these FRUs are suspected.
no FRU is identified, or a non-diagnosable error is found:
  human intervention is requested.

In the first two cases, the fault information is recorded on the FRU itself (or the multiple FRUs).

Once a component has been diagnosed as faulty or suspect, it is tagged as such by recording an appropriate tag in the dynamic portion of the FRUID EEPROM memory. Tagging the EEPROM memory can include adding a unique component identification, an initiator ID, an event code, and descriptive message to the EEPROM memory.

This information is extremely valuable because once the FRU goes back to the repair center, a diagnosed log of the fault is always available. Also the auto-diagnostic engine itself can reuse this information when doing another diagnostic later. A typical scenario for this happens when a FRU is diagnosed as suspect, and is therefore not deconfigured. Should an error reoccur on the same FRU, the error history will help the auto-diagnostic engine in finding a single faulty FRU within the system.

The role of the reconfiguration engine is to make sure that the faulty FRU(s) have been deconfigured from the system while assuring that the domains can be brought up properly.

It can be required to move domain configuration in order to isolate a faulty interconnect switch. The interconnect can be split into two segments, in order to provide complete domain isolation. If one segment has a faulty interconnect switch, then its domain will be migrated to the other segment where it can safely be brought up again.

Another role of the reconfiguration is to configure hotspare resources. This can happen when one or more CPUs are diagnosed as faulty. The domain can be brought up without these CPUs, but would suffer a performance penalty. If a spare CPU board is available, the reconfiguration engine can configure it into the domain automatically.

Some hardware errors can be correctable. However, if a FRU is presenting too many correctable errors, there is a great chance that one of these will turn into an uncorrectable one. Therefore, the system controller should deconfigure the failing component while the underlying domain is still running.

The correctable errors can be categorized into: parity errors; ECC errors; and environmental errors (voltage, temperature).

Depending on the failing resources, several options can be available to remove proactively the component. For a complete board, dynamic reconfiguration (DR) can be used. For DIMMs, the operating system could retire memory pages related to the failing DIMMs. The system controller can use an existing private communication channel for this.

When fault information is diagnosed (faulty and suspect cases), this information can be recorded. In the examples described herein, the information can be recorded on the FRU itself using the embedded electrically erasable (EE-PROM). The electrically erasable PROM can be a serial EEPROM, or SEEPROM. The EEPROM can include a static section and a dynamic section. The static section can include information such as a FRU part number, serial number, manufacturer, manufacturing date, etc.

The dynamic section can contain new records to store component health status (CHS) information, which is the current status of the FRU and some history of error events that the FRU encountered.

For the purposes of the present disclosure, hardware errors can be categorized into two types, namely correctable errors and uncorrectable errors.

Uncorrectable errors will trigger an error pause condition, and the hardware stops at that time, leaving the system in a state where analysis of the errors can be conducted.

Correctable errors do not trigger the error pause, so that the domain will continue its operation. Depending where the correctable error happened, the service controller and/or the domain might be notified. In order to diagnose such errors precisely, it is necessary that the domain notifies the SC when such errors happen, so that the SC is always aware of any errors happening in the platform.

In both cases, information is recorded in a FRU relating to the errors detected. Where the error is uncorrectable, and only a single such FRU is identified, the FRU will be flagged as faulty. If multiple FRUs are identified in response to an uncorrectable errors, then the FRU can be labeled as suspect. Where one or more FRUs are identified in response to a correctable errors, then the FRU(s) can be labeled as suspect. Where a FRU is labeled as suspect, this ill be detected during subsequent operation of the auto diagnosis engine and can be used to determine whether a FRU is faulty, or not.

There can be many different error bits that could be latched by hardware in response to a fault. In one example of a server system, for example, there can be over 13000 error bits that could be latched by the hardware. With the knowledge that errors tend to propagate, a hardware fault could result in many circuits reporting errors, which complicates the analysis process.

In one example, each error register can 32 bits wide, with the 16 most significant bits forming accumulated error bits with the 16 lower significant bits forming first error bits.

Most of the boards in the system can include a field programmable gate array (FPGA) chip, in which a first error indication at the ASIC level can be latched. The service controller board also has a FPGA in which first error indications at the board level can be latched.

Figure 16:
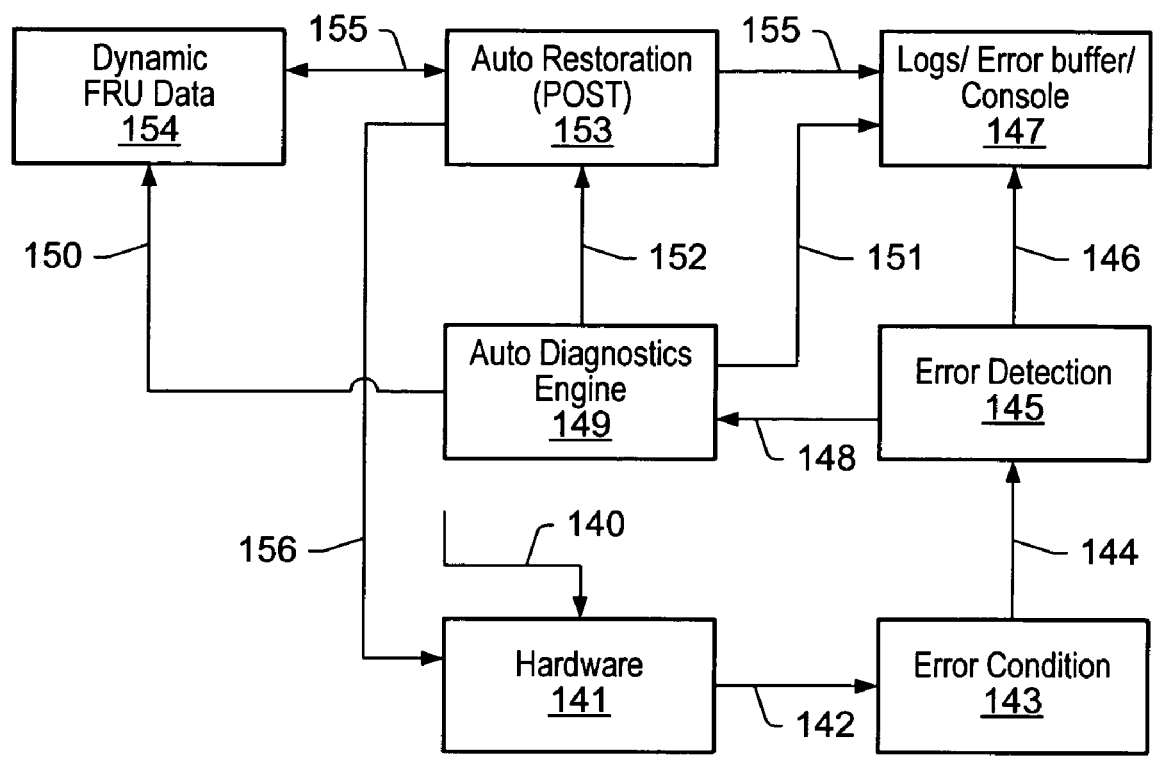
FIG. 16 is a schematic representation of phases in providing recovery from a system error.

FIG. 16 is a schematic representation of the operation of the embodiment of the invention.

At step 140, it is assumed that some first hardware error occurs within the hardware 141. This causes reporting of an error at 142 which results in an error condition 143. The reporting of an error condition 144 causes the system controller to initiate an error detection process 154. The initiation of the error detection process is reported 146, by logging the error in the error buffer and/or to a console 147. Also, the error detection process 145 causes 148 the auto diagnosis process 149 to be activated. Auto diagnosis of the errors is performed and the results are logged and/or reporting to a console 147. The auto diagnosis process also causes an auto restoration process 153 to be performed in the present instance, by the POST. Information relating to the detected errors is also stored 150 as dynamic FRU data 154 in the FRUID EEPROMs in the FRUs. The auto restoration process at 153 then uses the dynamic FRU data at 154 to reinitialize the system with the deconfiguration of 40 FRUs at 156. The auto restoration process also logs at 155 details of the restoration.

Figure 17:
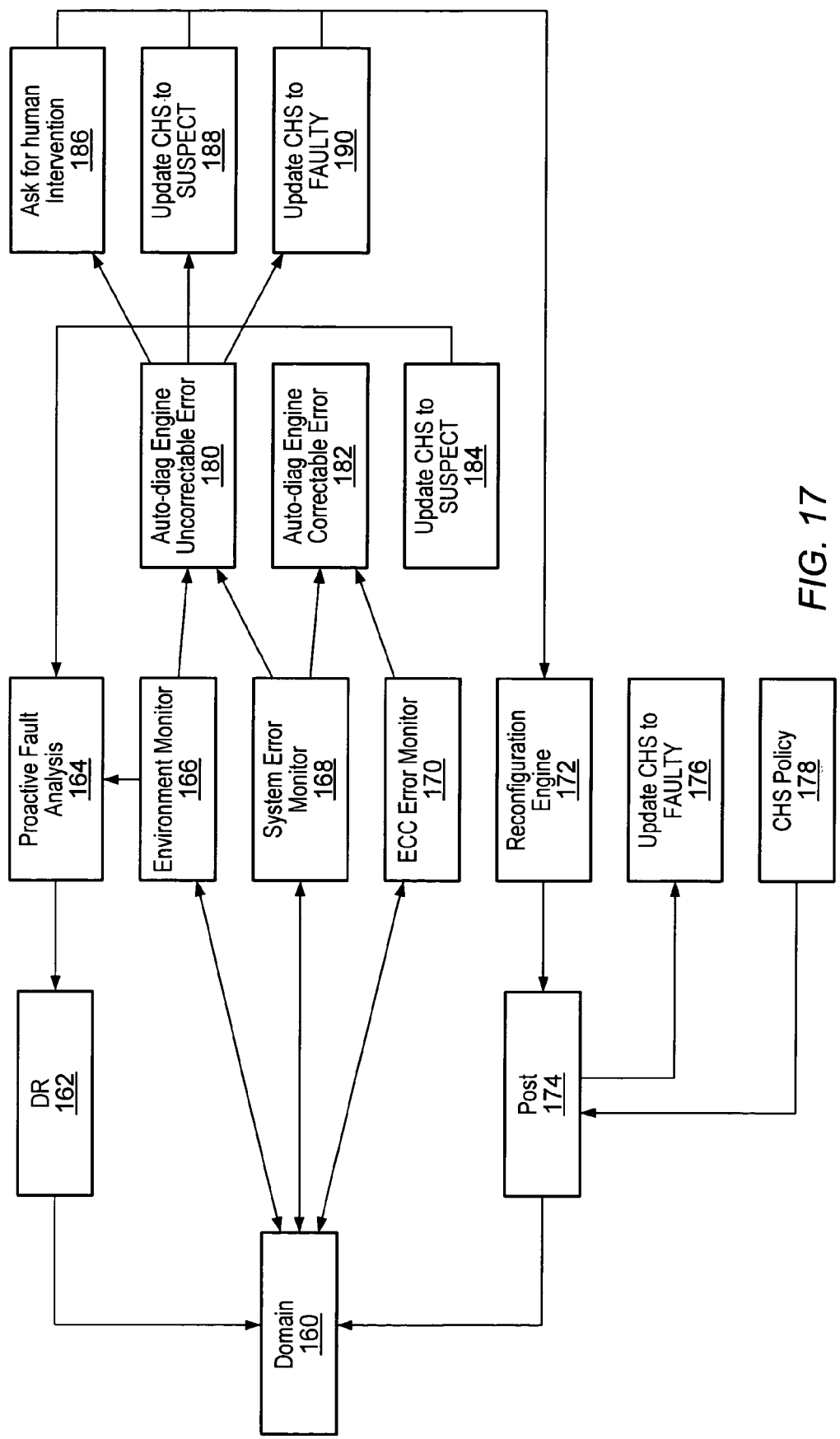
FIG. 17 provides an alternative schematic representation of phases in providing recovery from a system error.

FIG. 17 provides an alternative representation of the relationship between the various elements involved in the auto diagnosis and restoration process. In FIG. 17, a domain 160 is represented as being operable, and being monitored by an environmental monitor 166, a system error monitor 168 and error check code (ECC) error monitor 170. The system error monitor 168, and the ECC error monitor, 170 are operable to report to the auto diagnosis engine represented at 182 for the processing of a correctable error. The auto diagnosis engine 182 is operable to update the CHS for any FRU related to a correctable error as "suspect". Proactive fault analysis is performed at 164 on the basis of a correctable error and/or environmental factors identified by the environment monitor 166, to dynamically reconfigure (DR) 162 the domain 160. In the event of the system error monitor 168 identifying an uncorrectable error, the auto diagnosis engine is operable to process the uncorrectable error as represented at 180. In the event that a single FRU is identified as being faulty, then the CHS for the FRU concerned is set to faulty, and the appropriate information is stored in the FRUID EEPROM. If, a series of FRUs identified as faulty, the CHSs for the FRUs concerned are changed "suspect" and the appropriate information is stored in the FRUID EEPROMs concerned. If, an uncorrectable error is identified, then at 186, human intervention is requested, for example by an error message to a console. Following steps 186, 188 or 190, a reconfiguration engine 172 is operable to deconfigure any faulty FRUs, and the POST 174 is operable to reconfigure the domain 160 in accordance with the appropriate CHS policy 178. The POST is also operable to update the CHS to faulty for any faulty FRU(s).

In one example, the auto diagnosis engine is operable to proceed in five passes.

In pass 1, a board mask is built.

Using service controller FPGA, the auto diagnosis engine attempts to mask boards which did not report any first errors FE. However, should this information not be available for any reason, then all boards will be considered.

In pass 2, an ASIC mask is built for each board (all boards being considered here).

If the board, has an FPGA, then this is used to identify the ASIC(s) on the board that have reported a first error. If this information is available, an appropriate mask is then generated. Otherwise, all of the ASICs on the board will be considered.

It should be noted that not all ASICs are necessarily linked to the FPGA. For example, an error happening on a DDS chip will be reported as a 2SBBC error on the FPGA. Accordingly, in this case the auto diagnosis engine is operable to also access appropriate registers on the SBBC for such cases to determine whether an error occurred on a DDS. The same applies for hardware processor errors.

In pass 3 all unmasked boards, and within each such board, all unmasked ASICs are considered to identify any reported first errors.

This process is represented in the following pseudo-code:

```
For each board unmasked in pass 1
do
    for each ASIC unmasked in pass 2
    do
        if ASIC reported first error
        then
            "analyze error"
            set first_error_found = true
        fi
    od
od
```

In pass 4, if a first error was found in pass 3, then this pass is skipped, otherwise all errors on unmasked boards and unmasked ASICs are considered.

This process is represented in the following pseudo-code:

```
If first_error_found == false
then
    for each board unmasked in pass 1
    do
        for each ASIC unmasked in pass 2
        do
            if ASIC reported error
            then
                "analyze error"
            fi
        od
    od
fi
```

The "analyze error" task referenced in passes 3 and 4 is operable to convert one, hardware error to a single FRU, a list of FRUs or a non-diagnosable error.

For this process, fault tables and the hardware configuration information is used. The fault tables give information about the bad FRU(s) for a particular error (for example as represented in Table 1 above). It should, however, be noted that Table 1 is provided for purposes of illustration only, and that the fault tables used in any particular implementation can include many more and or different errors and FRU identification information. The tables take account of the fact that the reporting FRU could be the reporting FRU, the reported FRU or some other combination. In case of interconnect errors, the service controller can use hardware configuration information, for example as represented schematically in FIG. 14 to find which FRU or FRUs is or are connected to the FRU being diagnosed.

In pass 5, a list of suspects is then filtered.

The "analyze error" task identified in passes 3 and 4 can have caused a list of one or more suspect FRUs to be generated. In pass 5, FRUs which are not physically present and FRUs which are already diagnosed as faulty are filtered out.

At the end of pass 5, the result is one of the 3 options referenced earlier

The auto diagnosis engine is also responsive to correctable errors.

In the present examples of systems implementing the present invention, datapaths are protected by error checking codes (ECCs) and there are also parity signals covering the datapaths.

If a bit flip occurs, an ECC error will happen and the data will be corrected. Since the datapath is also protected by parity, it is possible to diagnose where the bit flip occurred.

The parity errors can be diagnosed by the auto diagnosis engine. However, the correctable error handling differs from the uncorrectable error handling as described above, in that even if a single FRU is diagnosed, it is considered as suspect (as opposed to faulty) as discussed above.

As mentioned above, the FRUs employ a consistent error reporting policy. In general, error signals propagate from the FRUs via the level 1 and level 2 switch interconnects to the system controller boards 18.

Figure 18:
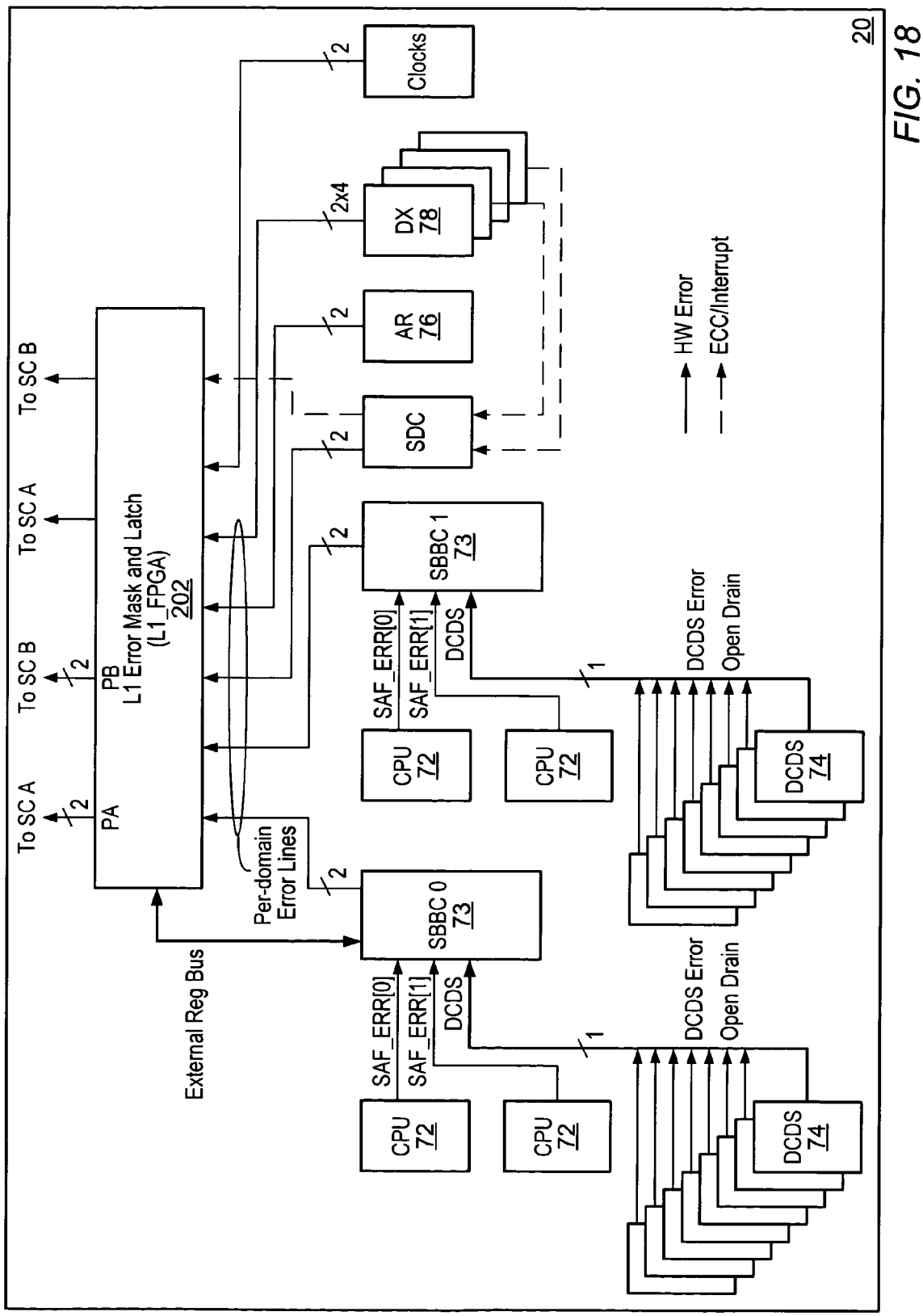
FIG. 18 is a schematic representation of the handling of error signals in a system module.

FIG. 18 illustrates error signals handling on a system board 20. Errors from a processor 72 CPU are recorded in the SBBC 73. The SBBCs 73 as well as the level 1 (L1) switch interface circuits (AR 76 and DX 78) drive per-domain error lines to a system board mask and latch FPGA 202. The FPGA 202 is an electrically programmable logic devices that has registers to hold error mask and error status information for two domains in each of 2 partitions. The FPGA 202 contains the mask for each of the error lines as well as error status for each of the lines. The FPGA 202 has logic for two separate "partitions" and on the system board 20 the error signals are duplicated to both parts of the logic. Each "partition" output is sent to a different System Controller board 18.

Figure 19:
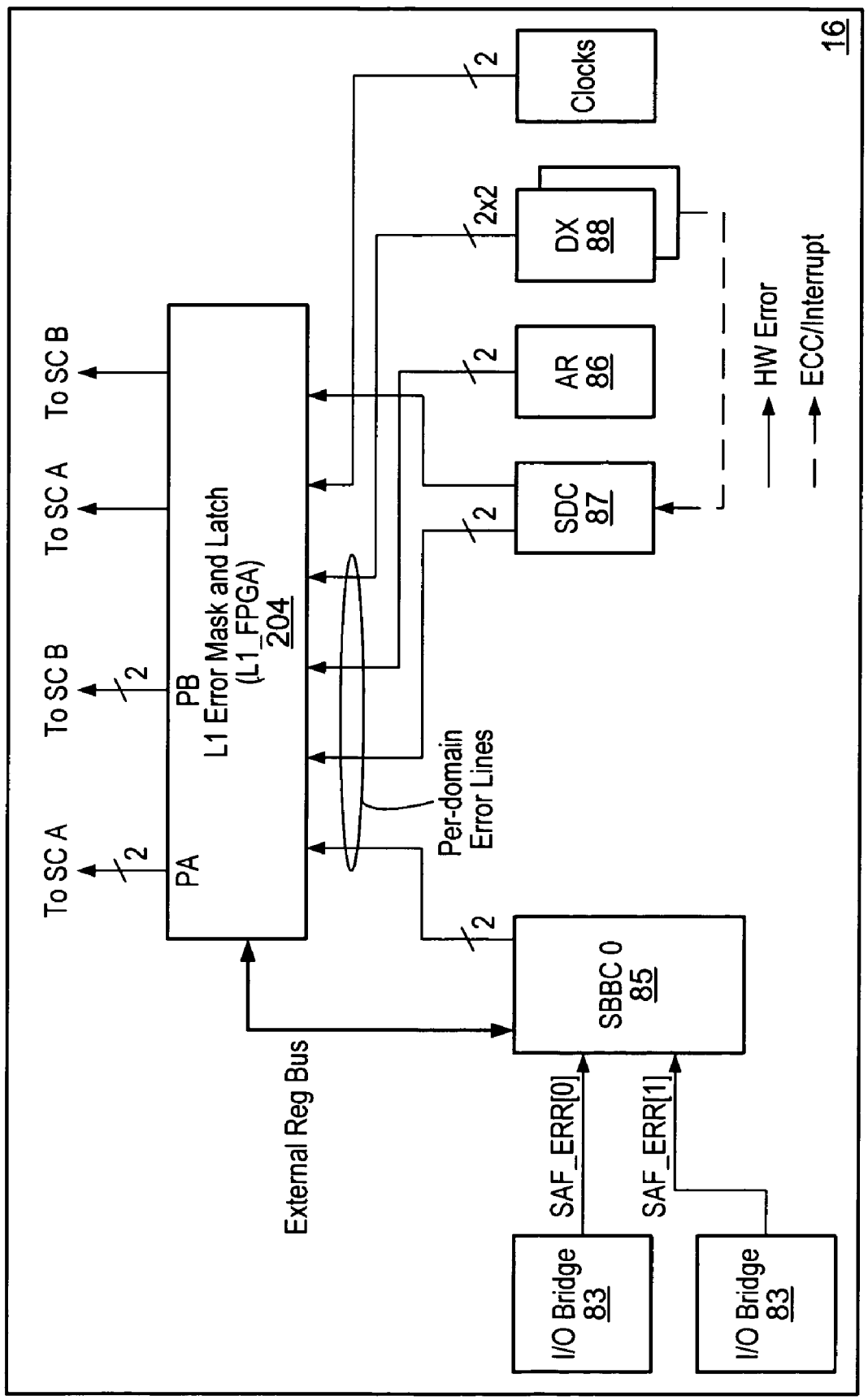
FIG. 19 is a schematic representation of the handling of error signals in an I/O module.

FIG. 19 illustrates error signal handling on an I/O board 16, which is similar to that on a system board 20, with errors from an I/O bridge 83 being recorded in the SBBC 85. The SBBCs 85 as well as the L1 switch interface circuits (AR 86 and DX 88) drive per-domain error lines to an I/O board mask and latch FPGA 204. The I/O board 16 also drives two copies of the board error signal per domain, one to each of the system controller boards 18.

Figure 20:
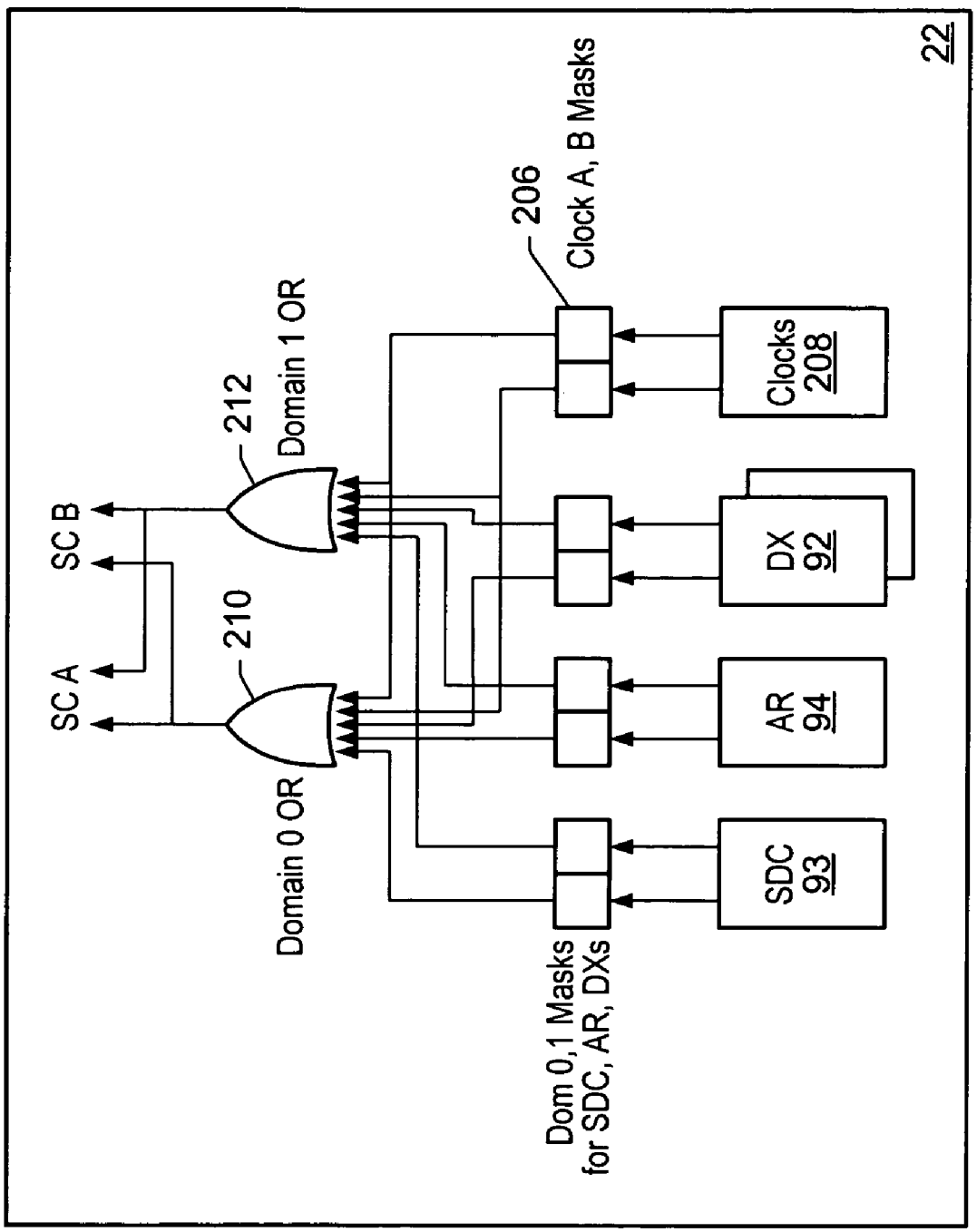
FIG. 20 is a schematic representation of the handling of error signals in a switch interconnect module.

FIG. 20 illustrates error signal handling on a switch interconnect board 20, which also drives two copies of each domain error, one to each of the system controller boards 18. There is no FPGA on switch interface boards 22, since there is no SBBC through which it can be accessed. An 8-bit mask register 206 is provided on the global I2C bus, which can mask individual domain errors from the SDC 93, the AR 94 and the DX pair 92, and individual clock errors from two clocks 208. These errors are ORed per domain at 210 and 212. Both the combined domain errors are sent to each system controller board 18.

Figure 21:
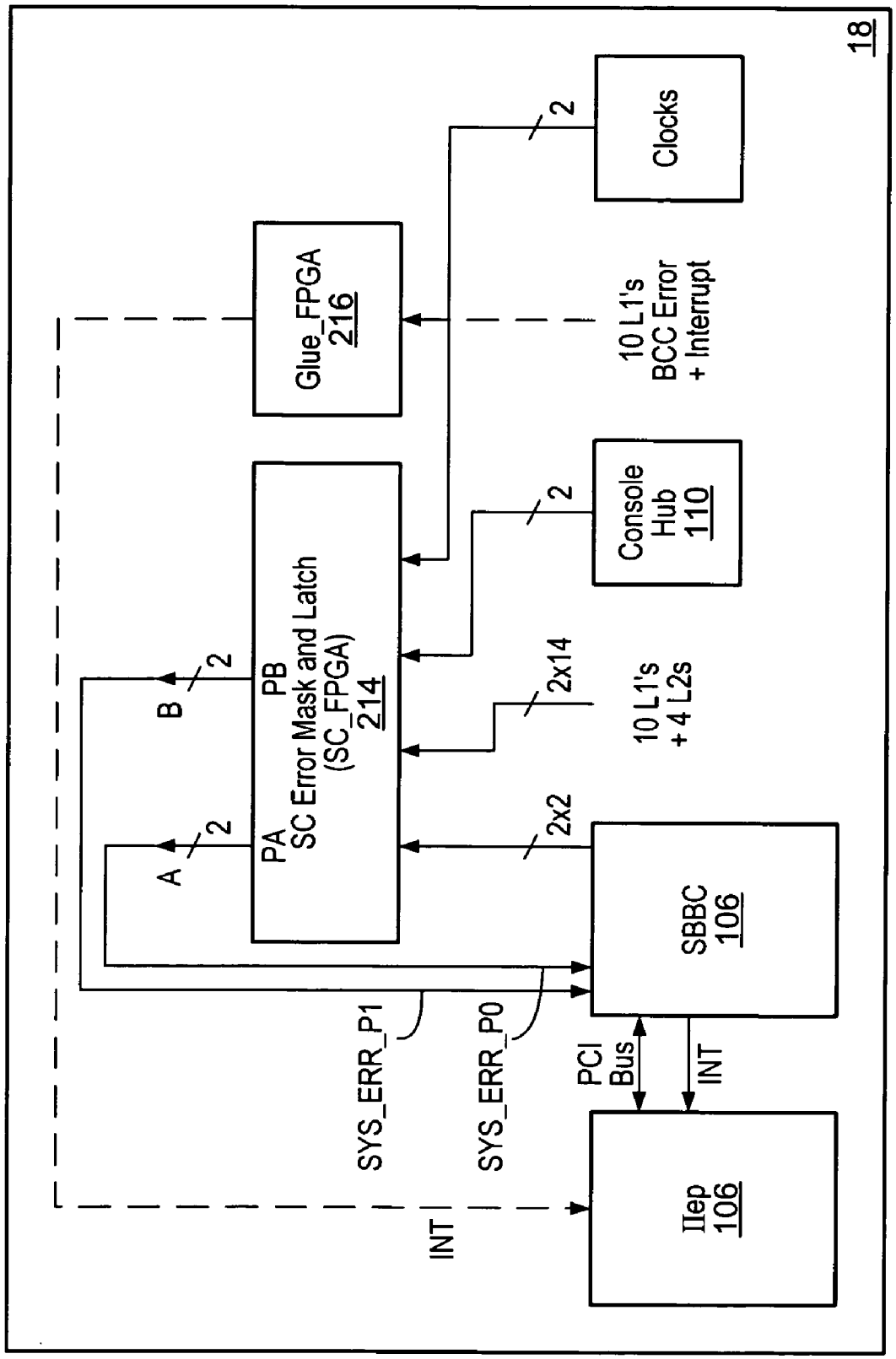
FIG. 21 is a schematic representation of the handling of error signals in a system controller module.

FIG. 21 illustrates error signal handling on the system controller board 18. Each system controller board 18 gets error information from each board (system boards 20, I/O boards 16 and switch interface boards 22) for each domain. The system controller SBBC 106 also drives error lines (in one example two lines, one per domain and in another example 4 lines one per domain per partition). The system controller board error mask and latch FPGA 214 has separate masks and logic for two separate partitions and the two outputs are connected to the SBBC where an SBBC control register define what action is to be taken when it detects an error and status is recorded in an SBBC Error Status Register. The Glue FPGA illustrated in FIG. 21 contains various registers for controlling I2C multiplexing lines and for clock control and status.

Thus, the SBBCs 106 on the system controller boards 18 determine what action(s) to take on the errors based on data stored in an SBBC error control register. Typical actions include setting appropriate error status bits, asserting an error pause to stop any further address packets being transmitted and interrupting the system controller 18 on the system controller board. At this point the system controller takes over, reading the various error status registers to find out what happened, and after determining the cause of the error possibly deciding whether the error is recoverable or not. If the error is recoverable, the system controller can clear the error status in the appropriate registers in the circuit(s) that detected the error and de-assert "error pause" by clearing appropriate system error bits in the SBBC error status register. If the error is not recoverable, the system controller may decide to reset the system which it can do by writing to a reset control register in the system controller SBBC 106. The error signals, error pause signals and reset signals can be isolated per partition and domain so that errors in one partition or domain do not effect other partitions or domains.

As mentioned above, the auto diagnosis engine is able to use error information previously recorded in a FRU to assist in diagnosis of the fault. For example, consider a situation where two FRUs are labeled as suspect, and an engineer replaces one of them. If, subsequently, a further error occurs, the auto diagnosis engine could initially conclude that one of the same two FRUs was suspect. However, it could further determine from the fault information and serial number recorded in the remaining FRU that the FRU concerned had not been replaced, and could thereby conclude that the FRU that had not been replaced, rather than the one that had been replaced, was the FRU that was faulty. In this case, the CHS of the FRU that had not been replaced could then be flagged as faulty and its FRUID EEPROM could be updated with a faulty indicator rather than a suspect indicator.

Also, the auto diagnosis engine could also be responsive to a plurality of correctable errors being recorded for a FRU as being indicative that a more serious fault was potentially going to occur and could recommend that the FRU be replaced, for example by changing the CHS of the FRU concerned to faulty and updating its FRUID EEPROM with a faulty indicator rather than a suspect indicator.

Although the embodiments above have been described in considerable detail, numerous variations and modifications will become apparent to those skilled in the art once the above disclosure is fully appreciated. It is intended that the following claims be interpreted to embrace all such variations and modifications.

For example although specific implementations have been described in a system employing a Solaris operating system and a PowerOn Self Test Utility, it will be appreciated that the invention is applicable to systems operating under other operating systems and system boot utilities.

Also, it will be appreciated that program products can be employed to provide at least part of the functionality of the present invention and that such program products could be provided on a suitable carrier medium. Such a carrier medium can include, by way of example only, a storage medium such as a magnetic, opto-magnetic or optical medium, etc., or a transmission medium such as a wireless or wired transmission medium or signal, etc.

What is claimed is:

1. A computer system comprising:
a plurality of field replaceable units;
a system controller operable to monitor system errors;
a diagnostic engine operable to, in response to the system controller detecting an error, identify a suspected faulty field replaceable unit, wherein the diagnostic engine is further operable to store component health status information on the suspected faulty field replaceable unit; and
a reconfiguration engine operable to deconfigure the suspected faulty field replaceable unit.

2. The computer system of claim 1, wherein the component health status information comprises an indication that the suspected field replaceable unit is faulty and an indication of a diagnostic reason the suspected field replaceable unit was found faulty.

3. The computer system of claim 1, wherein the diagnostic engine is operable to cause component health status information concerning each suspected faulty field replaceable unit to be stored in the suspected faulty field replaceable unit concerned.

4. The computer system of claim 1, wherein the diagnostic engine resides on the system controller and is operable to analyze hardware generated information to distinguish between a first error and non-first errors.

5. The computer system of claim 1, wherein the diagnostic engine is operable to identify a list of suspected faulty field replaceable units.

6. The computer system of claim 1, wherein the component health status information is stored in a dynamic portion of a field replaceable unit identity (FRUID) memory in the suspected faulty field replaceable unit.

7. The computer system of claim 6, wherein the FRUID memory is an electrically erasable programmable read only memory.

8. The computer system of claim 1, wherein the diagnostic engine is responsive to previously stored suspected fault information stored in a field replaceable unit of the plurality of field replaceable units in determining whether the field replaceable unit is faulty.

9. The computer system of claim 1, wherein the reconfiguration engine is operable to configure a redundant hardware field replaceable unit in place of a deconfigured suspected faulty field replaceable unit.

10. The computer system of claim 1, wherein the reconfiguration engine is responsive to stored component health status information in the suspected faulty field replaceable unit to deconfigure the suspected faulty field replaceable unit.

11. The computer system of claim 1, further comprising a plurality of processor domain segments interconnected by a switch, wherein the reconfiguration engine is further operable to migrate a domain to another segment in order to isolate a faulty switch.

12. The computer system of claim 1, further comprising circuitry in the plurality of field replaceable units, wherein the circuitry comprises error status registers for logging errors detected in the circuitry.

13. The computer system of claim 12, wherein an error status register, for circuitry in which a first error is detected, is operable separately to log the first error.

14. The computer system of claim 12, wherein the plurality of field replaceable units comprise further circuitry for reporting errors in the respective field replaceable unit to the system controller.

15. The computer system of claim 1, wherein the diagnostic engine is a software component of the service controller.

16. The computer system of claim 1, wherein the reconfiguration engine comprises a power on and self test utility.

17. The computer system of claim 1, further comprising a predictive fault analyzer.

18. A method of managing errors in a computer system comprising a plurality of field replaceable units, the method comprising:
a system controller monitoring system errors in the plurality of field replaceable units;
a diagnostic engine identifying a suspected faulty field replaceable unit of the plurality of field replaceable units;
the diagnostic engine storing component health status information on the suspected faulty field replaceable unit; and
a reconfiguration engine deconfiguring the suspected faulty field replaceable unit.

19. The method of claim 18, further comprising the diagnostic engine analyzing hardware generated information to distinguish between a first error and a non-first error.

20. The method of claim 18, wherein the component health status information comprises an indication that the suspected field replaceable unit is faulty and an indication of a diagnostic reason the suspected field replaceable unit was found faulty.

21. The method of claim 18, wherein the component health status information is stored in a dynamic portion of a field replaceable unit identity (FRUID) memory in the suspected field replaceable unit concerned.

22. The method of claim 21, wherein the FRUID memory is an electrically erasable programmable read only memory.

23. The computer system of claim 20, wherein the reconfiguration engine is further operable to read the component health status information stored on the suspected faulty field replaceable unit and deconfigure the suspected faulty field replaceable unit in response to the stored component health status information.

24. The method of claim 18, further comprising the diagnostic engine identifying a list of suspected faulty field replaceable units.

25. The method of claim 18, further comprising the diagnostic engine causing component health status information concerning each suspected faulty field replaceable unit to be stored in the suspected faulty field replaceable unit concerned.

26. The method of claim 18, wherein the diagnostic engine is responsive to previously stored suspected fault information stored in a field replaceable unit of the plurality of field replaceable units in determining whether the field replaceable unit is faulty.

27. The method of claim 18, further comprising the reconfiguration engine configuring a redundant hardware field replaceable unit in place of a deconfigured suspected faulty field replaceable unit.

28. The method of claim 18, further comprising the reconfiguration engine migrating a domain to another segment in order to isolate a faulty switch, wherein a plurality of processor domain segments are interconnected by one or more switches.

29. The method of claim 18, further comprising logging, in an error status register in the circuitry, errors detected in circuitry in the field replaceable units.

30. The method of claim 29, further comprising separately logging a first error in the error status register.

31. The method of claim 30, further comprising additional circuitry in the plurality of field replaceable units reporting logged errors to the system controller.

32. The method of claim 18, wherein the diagnostic engine is a software component of a service controller.

33. The method of claim 18, wherein the reconfiguration engine comprises a power on self test utility.

34. A program product on a computer-readable storage medium, the program product comprising instructions operable to cause a computer system that includes a plurality of field replaceable units:
- to monitor hardware system errors;
- to identify a suspected faulty field replaceable unit; and
- to store component health status information on the suspected faulty field replaceable unit;
- wherein the suspected faulty field replaceable unit is operable to be deconfigured from the computer system in response to the stored component health status information.

35. A computer system comprising:
- a plurality of field replaceable units;
- means for monitoring system errors;
- means responsive to a detected system error to identify a suspected faulty field replaceable unit;
- means operable to store component health status information on the suspected faulty field replaceable unit; and
- means for deconfiguring the faulty field replaceable unit from the computer system in response to the stored component health status information.

* * * * *